United States Patent
Eom et al.

(10) Patent No.: US 10,514,835 B2
(45) Date of Patent: Dec. 24, 2019

(54) METHOD OF SHIFTING CONTENT AND ELECTRONIC DEVICE

(71) Applicant: Samsung Electronics Co., Ltd., Gyeonggi-do (KR)

(72) Inventors: Junbong Eom, Hwaseong-si (KR); Young-Hwan Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 417 days.

(21) Appl. No.: 15/220,848

(22) Filed: Jul. 27, 2016

(65) Prior Publication Data

US 2017/0031569 A1    Feb. 2, 2017

(30) Foreign Application Priority Data

Jul. 27, 2015  (KR) .................. 10-2015-0106052

(51) Int. Cl.
*G06F 3/048*    (2013.01)
*G06F 3/0484*    (2013.01)
*G06F 3/0488*    (2013.01)
*G06F 3/0485*    (2013.01)

(52) U.S. Cl.
CPC ........ *G06F 3/04845* (2013.01); *G06F 3/0485* (2013.01); *G06F 3/04883* (2013.01)

(58) Field of Classification Search
CPC ............... G06F 3/0488; G06F 3/04845; G06F 3/04847; G06F 2203/04808; G06F 3/0416; G06F 3/0484; G06F 9/451; G06F 3/0485; G06F 3/017; G06F 1/1694; G06F 3/0346; G06F 3/03547; G06F 3/0487; G06F 3/041; G06F 2200/1637; G06F 2203/04104; G06F 3/048; G06F 3/04812

See application file for complete search history.

(56) References Cited

U.S. PATENT DOCUMENTS

2013/0106744 A1*  5/2013  Asakura ........... G06F 3/0485
                                                           345/173
2013/0222301 A1   8/2013  Lee et al.

FOREIGN PATENT DOCUMENTS

KR    20130097594    9/2013

* cited by examiner

*Primary Examiner* — Phuong H Nguyen

(57) ABSTRACT

The present disclosure relates to a method of shifting content on a display of an electronic device. In one embodiment, the method includes displaying the content, setting a first coordinate value for a touch as a reference point, setting at least one shift direction determination area based on the reference point, identifying a second coordinate value for the touch, setting the direction in which the content is to be shifted based on the shift direction determination area and the second coordinate value, and shifting the content in the set shift direction. Other embodiments are possible.

19 Claims, 15 Drawing Sheets

METHOD OF SHIFTING CONTENT AND ELECTRONIC DEVICE

CROSS-REFERENCE TO RELATED APPLICATION(S) AND CLAIM OF PRIORITY

The present application is related to and claims the benefit under 35 U.S.C. § 119(a) to Korean Application Serial No. 10-2015-0106052, which was filed in the Korean Intellectual Property Office on Jul. 27, 2015, the entire content of which is hereby incorporated by reference.

TECHNICAL FIELD

The present disclosure relates to an electronic device and a method of shifting content displayed on an electronic device.

BACKGROUND

With the common use of electronic devices that have touch screens, users can identify various types of content (such as websites, image data, etc.) using the electronic devices.

The users may identify a part of the content that is larger than the touch screen of the electronic device and may also enlarge a region of the content to identify the content.

Meanwhile, the users may identify the content by manipulating the touch screen on which the content is displayed in order to shift the displayed content in a desired direction.

SUMMARY

These electronic devices may shift the content in a direction irrespective of the user's intentions on account of the user's mistakes in manipulating the electronic devices or on account of the user's errors in measuring the touches that indicate the direction in which the content is to be shifted.

To address the above-discussed deficiencies, it is a primary object to provide a method of shifting content and an electronic device that can shift content displayed on the electronic device in the direction that corresponds to a user's intention when the user's drag for shifting the content is detected.

An electronic device, according to an embodiment of the present disclosure, may include: a housing; a touch screen disposed on one side of the housing and having a first edge extending in a first direction and a second edge extending in a second direction that is substantially perpendicular to the first direction; a processor electrically connected to the touch screen; and a memory electrically connected to the processor, wherein the memory may store instructions that allow the processor, when being executed, to: display a screen on the touch screen; receive a gesture input, through the touch screen, which has first coordinates, second coordinates, and at least one between the first coordinates and the second coordinates; determine whether the gesture input corresponds to one of the following areas: (1) a first area defined between a first virtual line and a second virtual line, the first virtual line extending in a third direction different from the first and second directions without passing through the first coordinates, and the second virtual line extending in a fourth direction different from the first and second directions and opposite to the first virtual line with respect to the first coordinates, (2) a second area opposite to the first area with respect to the first virtual line, and (3) a third area opposite to the first area with respect to the second virtual line; and shift the screen in the first direction, in the second direction, or in one direction between the first and second directions based on the determined area.

An electronic device, according to an embodiment of the present disclosure, may include: a housing; a touch screen disposed on one side of the housing and having a first edge extending in a first direction and a second edge extending in a second direction that is substantially perpendicular to the first direction; a processor electrically connected to the touch screen; and a memory electrically connected to the processor, wherein the memory may store instructions that allow the processor, when being executed, to: display a screen on the touch screen; receive a gesture input, through the touch screen, which has first coordinates and second coordinates; acquire a first shift value in the first direction and a second shift value in the second direction based on the shift of the gesture input from the first coordinates to the second coordinates; compute a first result value and a second result value using the first shift value and the second shift value; shift the screen in the first direction according to the result obtained by comparing the first result value with a first threshold value; shift the screen in the second direction according to the result obtained by comparing the second result value with a second threshold value; and shift the screen in a third direction between the first and second directions according to the result obtained by comparing the first result value with the first threshold value and the result obtained by comparing the second result value with the second threshold value.

A method of shifting content, according to an embodiment of the present disclosure, may include: displaying the content; setting a first coordinate value for a touch as a reference point; setting at least one shift direction determination area based on the reference point; identifying a second coordinate value for the touch; setting the direction in which the content is to be shifted based on the shift direction determination area and the second coordinate value; and shifting the content in the set shift direction.

As described above, the method of shifting contented the electronic device of the present disclosure can shift content displayed on the electronic device in the direction that corresponds to a user's intention when a drag for shifting the content is detected, thereby enhancing, user convenience.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
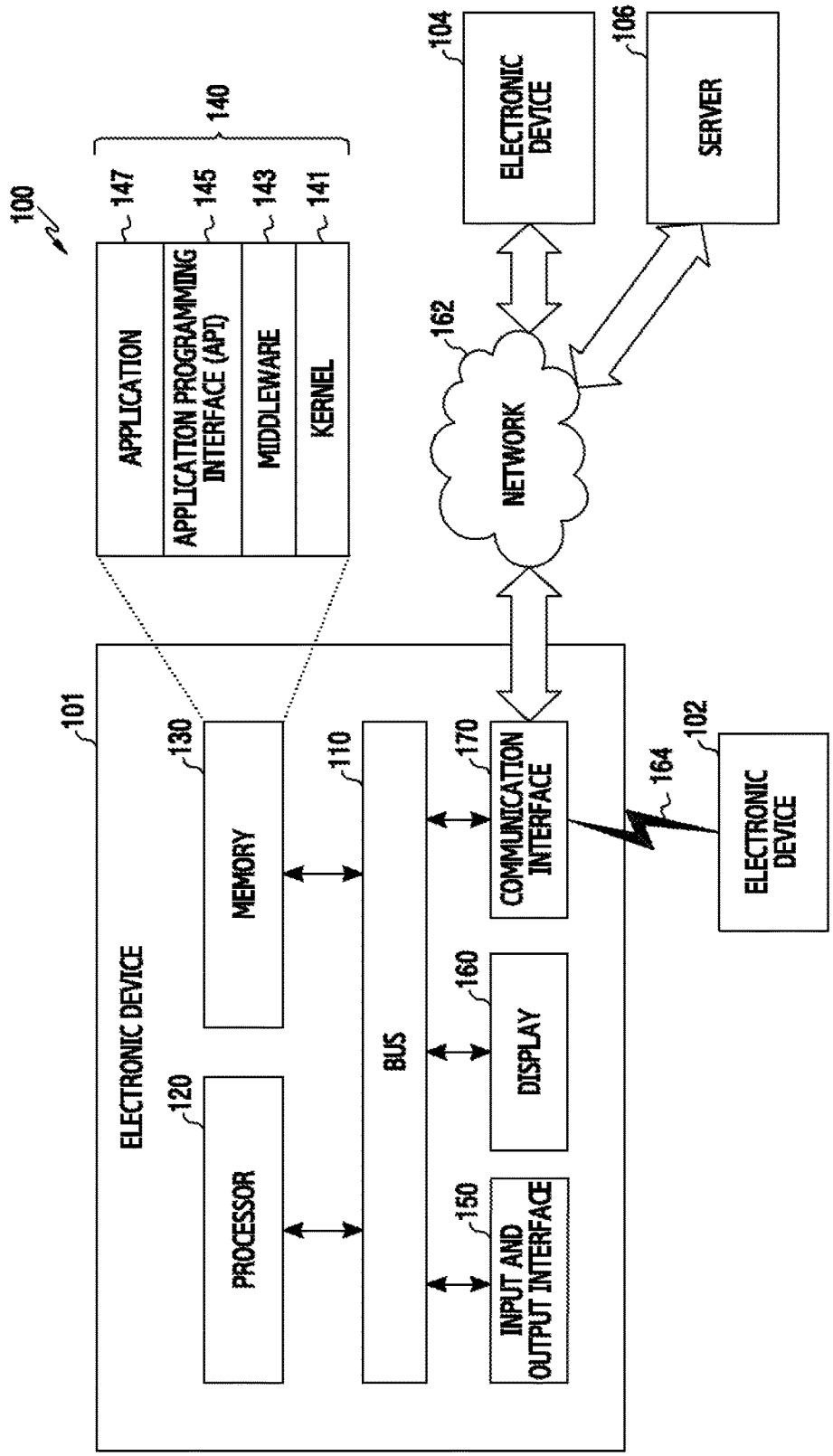
FIG. 1 illustrates a network environment that includes an electronic device according to an embodiment of the present disclosure.

FIGS. 1 through 15, discussed below, and the various embodiments used to describe the principles of the present disclosure in this document are by way of illustration only and should not be construed in any way to limit the scope of the disclosure. Those skilled in the art will understand that the principles of the present disclosure may be implemented in any suitably arranged electronic device.

Hereinafter, exemplary embodiments of the present disclosure will be described in detail with reference to the accompanying drawings. Detailed descriptions of well-known functions and structures incorporated herein may be omitted to avoid obscuring the subject matter of the present disclosure. Further, the terms used herein are defined in consideration of functions of the present disclosure and may vary depending on a user's or an operator's intention and usage. Therefore, the terms used herein should be understood based on the descriptions made herein. In the present disclosure, an expression such as "A or B," "at least one of A or/and B," or "one or more of A or/and B" may include all possible combinations of together listed items. Expressions such as "first," "second," "primarily," or "secondary," used in various exemplary embodiments may represent various elements regardless of order and/or importance and do not limit corresponding elements. The expressions may be used for distinguishing one element from another element. When it is described that an element (such as a first element) is "(operatively or communicatively) coupled" to or "connected" to another element (such as a second element), the element can be directly connected to the other element or can be connected through the other element such as a third element).

An expression "configured to (or set)" used in the present disclosure may be replaced with, for example, "suitable for" "having the capacity to," "designed to," "adapted to," "made to," or "capable of" according to a situation. A term "configured to (or set)" does not always mean only "specifically designed to" by hardware. Alternatively, in some situation, an expression "apparatus configured to" may mean that the apparatus "can" operate together with another apparatus or component. For example, a phrase "a processor configured (or set) to perform A, B, and C" may be a generic-purpose processor (such as a Central Processing Unit (CPU) or an application processor) that can perform a corresponding operation by executing at least one software program stored at an exclusive processor (such as an embedded processor) for performing a corresponding operation or at a memory device.

An electronic device according to various exemplary embodiments of the present disclosure can include, for example, at least one of a smart phone, a tablet Personal Computer (PC), a mobile phone, a video phone, an e-book reader, a desktop PC, a laptop PC, a netbook computer, a workstation, a sever, a Personal Digital Assistant (PDA), a Portable Multimedia Player (PMP), an MPEG 3 (MP3) player, a mobile medical equipment, a camera, and a wearable device. The wearable device can include at least one of an accessory type (e.g., a watch, a ring, a bracelet, an ankle bracelet, a necklace, glasses, a contact lens, or a Head-Mounted-Device (HMD)), a fabric or clothing embedded type (e.g., electronic garments), a body attachable type (e.g., a skin pad or a tattoo), and an implantable circuit. The electronic device can include at least one of, for example, a television, a Digital Video Disk (DVD) player, an audio device, a refrigerator, an air-conditioner, a cleaner, an oven, a microwave oven, a washing machine, an air cleaner, a set-top box, a home automation control panel, a security control panel, a media box (such as Samsung HomeSync™, Apple TV®, or Google TV®), a game console (such as Xbox®, PlayStation®), an electronic dictionary, an electronic key, a camcorder, and an electronic frame.

In another embodiment, the electronic device can include at least one of various medical devices (such as various portable medical measuring devices (a blood sugar measuring device, a heartbeat measuring device, a blood pressure measuring device, or a body temperature measuring device), a Magnetic Resonance Angiography (MRA) device, a Magnetic Resonance Imaging (MRI) device, a Computed Tomography (CT) device, a scanning, machine, and an ultrasonic wave device), a navigation device, a Global Navigation Satellite System (GNSS), an Event Data Recorder (EDR) a Flight Data recorder (FDR), a vehicle information device, an electronic equipment for ship (such as a navigation device for ship and gyro compass), avionics, a security device, a head unit for a vehicle, an industrial or home robot, a drone, an Automatic Teller's Machine (ATM) of a financial institution, a point of sales (POS) of a store, and Internet of things (such as a bulb, various sensors, a sprinkler device a fire alarm, a thermostat, a street light, a toaster, a sports equipment, a hot water tank, a heater, and a boiler). According to an embodiment, the electronic device can include at least one of a portion of furniture, building/construction or vehicle, an electronic board, an electronic signature receiving device, a projector, and various measuring devices (such as water supply, electricity, gas, or electric wave measuring device). An electronic device according to an embodiment is a flexible electronic device or a combination of two or more of the foregoing various devices. An electronic device according to an embodiment of the present disclosure is not limited to the foregoing devices and includes a new electronic device according to technical development. In this specification, the term "user" can refer to a person using an electronic device or a device using an electronic device (e.g., an artificial intelligent electronic device).

Referring to FIG. 1, an electronic device 101 resides in a network 100. The electronic device 101 can include a bus 110, a processor 120, a memory 130, an input/output interface 150, a display 160, and a communication interface 170. The electronic device 101 can omit at least one of the components or further include another component. The bus 110 can include a circuit for connecting the components 110 to 170 and delivering communication signals (e.g., control messages or data) therebetween. The processor 120 can include one or more of a central processing unit, an application processor, processor, and a Communication Processor (CP). The processor 120, for example, can perform an operation or data processing on control and/or communication of at least another component of the electronic device 101.

The memory 130 can include a volatile and/or nonvolatile memory. The memory 130, for example, can store commands or data relating to at least another component of the electronic device 101. According to an embodiment, the memory 130 can store software and/or a program 140. The program 140, for example, can include a kernel 141, middleware 143, an Application Programming Interface (API) 145, and/or an application program (or "application") 147. At least part of the kernel 141, the middleware 143, or the API 145 can be called an Operating System (OS). The kernel 141 can control or manage system resources (e.g., the bus 110, the processor 120, or the memory 130) used for performing operations or functions implemented by the other programs (e.g., the middleware 134, the API 145, or the application program 147). Additionally, the kernel 141 can provide an interface for controlling or managing system resources by accessing an individual component of the electronic device 101 from the middleware 143, the API 145, or the application program 147.

The middleware 143, for example, can serve as an intermediary role for exchanging data between the API 145 or the application program 147 and the kernel 141 through communication. Additionally, the middleware 132 can process one or more job requests received from the application program 147, based on their priority. For example, the middleware 143 can assign a priority for using a system resource (e.g., the bus 110, the processor 120, or the memory 130) of the electronic device 101 to at least one of the application programs 147, and process the one or more job requests. The API 145, as an interface through which the application 147 controls a function provided from the kernel 141 or the middleware 143, can include, for example, at least one interface or function (e.g., an instruction) for file control, window control, image processing, or character control.

The input/output interface 150, for example, can deliver commands or data inputted from a user or another external device to another component(s) of the electronic device 101, or output commands or data inputted from another component(s) of the electronic device 101 to a user or another external device.

The display 160, for example, can include a Liquid Crystal Display (LCD), a Light Emitting Diode (LED) display, an Organic Light Emitting Diode (OLED) display, a MicroElectroMechanical Systems (MEMS) display, or an electronic paper display. The display 160, for example, can display various contents (e.g., texts, images, videos, icons, and/or symbols) to the user. The display 160 can include a touch screen, for example, and receive touch, gesture, proximity, or hovering inputs by using an electronic pen or a user's body part. The communication interface 170, for example, can set communication between the electronic device 101 and an external device (e.g., a first external electronic device 102, a second external electronic device 104, or a server 106). For example, the communication interface 170 can communicate with the external device (e.g., the second external electronic device 104 or the server 106) over the network 162 through wireless communication or wired communication.

The wireless communication, for example, can at least one of Long Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro), and Global System for Mobile Communications (GSM), as a cellular communication protocol. The wireless communication may include, for example, short-range communication 164. The short-range communication 164 may be conducted by, for example, at least one of WiFi®, Bluetooth®, Bluetooth Low Energy (BLE), Zigbee®, Near Field Communication (NFC), magnetic secure transmission, Radio Frequency (RF), and Body Area Network (BAN). The wireless communication can include GNSS. The GNSS can include, for example, Global Positioning System (GPS), Global Navigation Satellite System (GLONASS), BeiDou navigation satellite system (BeiDou), or Galileo (the European global satellite-based navigation system). Hereafter, the GPS can be interchangeably used with the GNSS. The wired communication, for example, can include at least one of Universal Serial Bus (USB), High Definition Multimedia Interface (HDMI), Recommended Standard 232 (RS-232), power line communications, and Plain Old Telephone Service (POTS). The network 162 can include at least one of telecommunications networks such as computer network (e.g., LAN or WAN), Internet, and telephone network.

Each of the first and second external electronic devices 102 and 104 can be the same or different type of the electronic device 101. According to various embodiments, all or part of operations executed in the electronic device 101 can be executed by another or a plurality of electronic devices (e.g., the electronic device 102 or 104 or the server 106). When the electronic device 101 is to perform a function or service automatically or at the request, instead of performing the function or the service by the electronic device 101 or additionally, the electronic device 101 can request at least part of a function relating thereto from another device (e.g., the electronic device 102 or 104, or the server 106). The other electronic device (e.g., the electronic device 102 or 104, or the server 106) can perform the requested function or an additional function and deliver its result to the electronic device 101. The electronic device 101 can provide the requested function or service by processing the received result as it is or additionally. For doing so, for example, cloud computing, distributed computing, or client-server computing techniques can be used.

Figure 2:
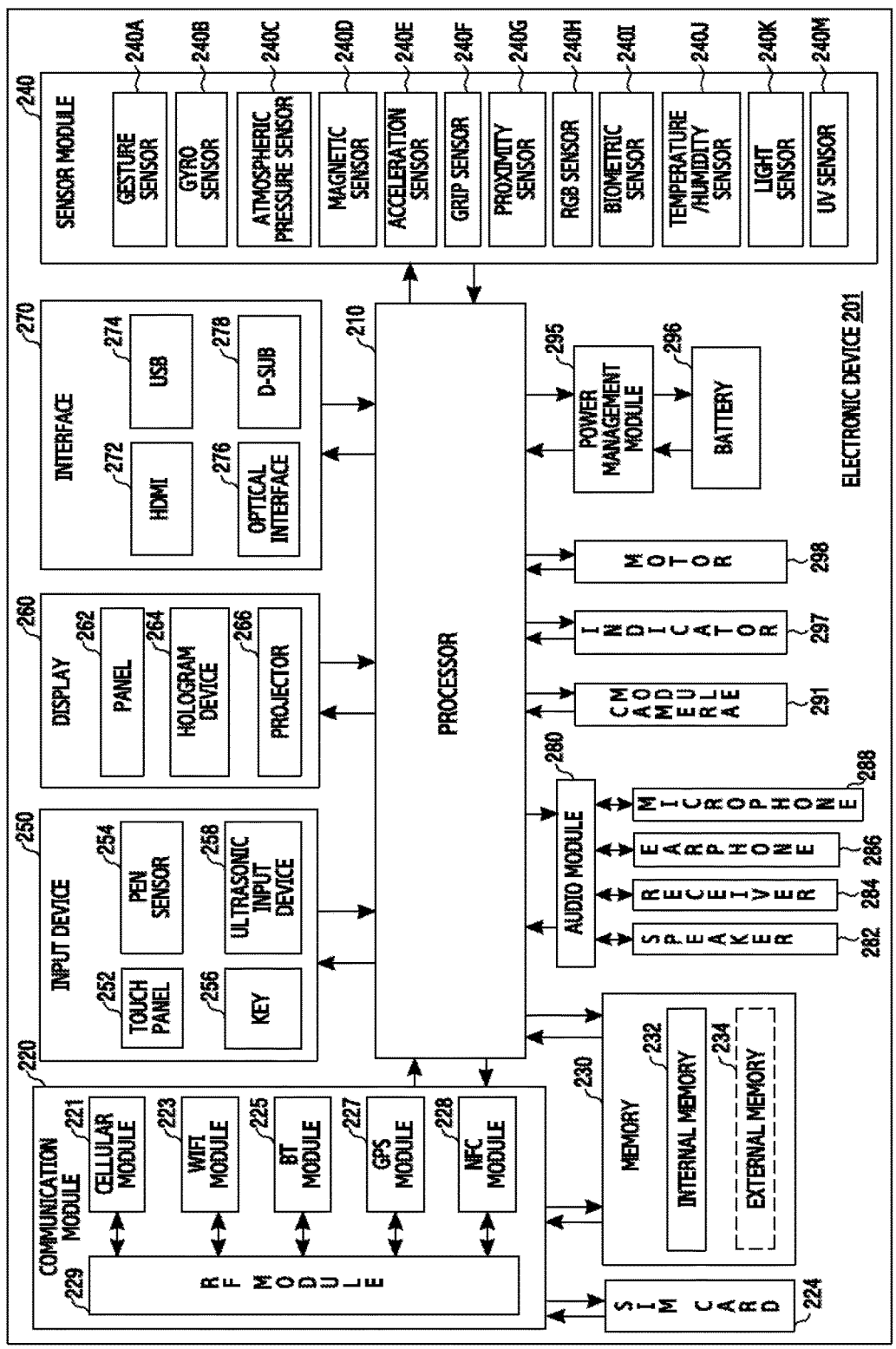
FIG. 2 illustrates the main configuration of an electronic device according to an embodiment of the present disclosure.

FIG. 2 illustrates an electronic device 201 according to various embodiments of the present disclosure. The electronic device 201, for example, can include all or part of the above-mentioned electronic device 101 Shown in FIG. 1. The electronic device 201 can include one or more processors (e.g., an Application Processor (AP)) 210, a communication module 220, a Subscriber Identification Module (SIM) card 224, a memory 230, a sensor module 240, an input device 250, a display 260, an interface 270, an audio module 280, a camera module 291, a power management module 295, a battery 296, an indicator 297, and a motor 298. The processor 210, for example, can control a plurality of hardware or software components connected to the processor 210 and also perform various data processing and operations by executing an operating system or an application program. The processor 210 can be implemented with a System on Chip (SoC), for example. The processor 210 can further include a Graphic Processing Unit (GPU) and/or an image signal processor. The processor 210 can include at least part (e.g., a cellular module 221) of the components shown in FIG. 2. The processor 210 can load commands or data received from at least of other components (e.g., a nonvolatile memory) into a volatile memory, process them, and store various data in the nonvolatile memory.

The communication module 220 can have the same or similar configuration to the communication interface 170. The communication module 220 can include, for example, a cellular module 221, a WiFi® module 223, a Bluetooth® (BT) module 225, a GNSS module 227, an NFC module 228, and an RF module 229. The cellular module 221, for example, can provide voice call, video call, Short Message Service (SMS), or internet service through a communication network. The cellular module 221 can identify and authenticate the electronic device 201 in a communication network by using a subscriber identification module (e.g., the SIM card 224). The cellular module 221 can perform at least part of a function that the processor 210 provides. The cellular module 221 can further include a CP. At least part (e.g., two or more) of the WiFi® module 273, the BT module 225, the GNSS module 227, and the NFC module 228 can be included in one integrated chip (IC) or an IC package. The RF module 229, for example, can transmit/receive a communication signal (e.g., an RF signal). The RF module 229, for example, can include a transceiver, a Power Amp Module (PAM), a frequency filter, a Low Noise Amplifier (LNA), or an antenna. According to another embodiment, at least one of the cellular module 221, the WiFi® module 223, the BT module 225, the GNSS module 227, and the NFC module 228 can transmit/receive an RF signal through an additional RF module. The SIM card 224, for example, can include a card including a subscriber identification module or an embedded SIM, and also can contain unique identification information (e.g., an Integrated Circuit Card Identifier (ICCID)) or subscriber information (e.g., an International Mobile Subscriber Identity (IMSI)).

The memory 230 (e.g., the memory 130) can include an internal memory 232 or an external memory 234. The internal memory 232 can include at least one of, for example, a volatile memory (e.g., Dynamic RAM (DRAM), Static RAM (SRAM), or Synchronous Dynamic RAM (SDRAM)), and a non-volatile memory (e.g., One Time Programmable ROM (OTPROM), Programmable ROM (PROM), Erasable and Programmable ROM (EPROM), Electrically Erasable and Programmable ROM (EEPROM), mask ROM, flash ROM, flash memory, hard drive, and solid state drive (SSD)). The external memory 234 can include flash drive, for example, Compact Flash (CF), Secure Digital (SD), micro SD, mini SD, extreme digital (xD), Multi-Media Card (MMC), or memory stick. The external memory 234 can be functionally or physically connected to the electronic device 201 through various interfaces.

The sensor module 240 can, for example, measure physical quantities or detect an operating state of the electronic device 201, and thus convert the measured or detected information into electrical signals. The sensor module 240 can include at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red, green, blue (RGB) sensor), a biometric sensor 240I, a temperature/humidity sensor 240J, an illumination sensor 240K, and an Ultra Violet (UV) sensor 240M. Additionally/alternately, the sensor module 240 can include an E-nose sensor, an electromyography (EMG) sensor, an electroencephalogram (EEG) sensor, an electrocardiogram (ECG) sensor, an infra-red (IR) sensor, an iris sensor, and/or a fingerprint sensor. The sensor module 240 can further include a control circuit for controlling at least one sensor therein. The electronic device, as part of the processor 210 or individually, can further include a processor configured to control the sensor module 240 and thus control the sensor module 240 while the processor 210 is sleeping.

The input device 250 can include, for example, a touch panel 252, a (digital) pen sensor 254, a key 256, or an ultrasonic input device 258. The touch panel 252 can use at least one of, for example, capacitive, resistive, infrared, and ultrasonic methods. Additionally, the touch panel 252 can further include a control circuit. The touch panel 252 can further include a tactile layer to provide a tactile response to a user. The (digital) pen sensor 254 can include, for example, part of a touch panel or a sheet for recognition. The key 256 can include, for example, a physical button, a touch key, an optical key, or a keypad. The ultrasonic input device 258 can detect ultrasonic waves from an input means through a microphone (e.g., a microphone 288) and check data corresponding to the detected ultrasonic waves.

The display 260 (e.g., the display 160) can include a panel 262, a hologram device 264, a projector 266, and/or a control circuit for controlling them. The panel 262 can be implemented to be flexible, transparent, or wearable, for example. The panel 262 and the touch panel 252 can be configured with one or more modules. The hologram device 264 can show three-dimensional images in the air by using the interference of light. The projector 266 can display an image by projecting light on a screen. The screen, for example, can be placed inside or outside the electronic device 201. The interface 270 can include a High-Definition Multimedia Interface (HDMI) 272, a Universal Serial Bus (USB) 274, an optical interface 276, or a D-subminiature (sub) 278, for example. The interface 270 can be included in the communication interface 170 of FIG. 1 for example. Additionally or alternatively, the interface 270 can include a Mobile High-Definition Link (MHL) interface, a SD card/MMC interface, or an Infrared Data Association (IrDA) standard interface.

The audio module 280, for example, can convert sound into electrical signals and convert electrical signals into sounds. At least some components of the audio module 280 can be included in the input/output interface 150 of FIG. 1, for example. The audio module 280 can process sound information inputted or outputted through a speaker 282, a receiver 284, an earphone 286, or the microphone 288. The camera module 291, as a device for capturing a still image and a video, can include one or more image sensors (e.g., a front sensor or a rear sensor), a lens, an image Signal Processor (ISP), or a flash (e.g., an LED or a xenon lamp). The power management module 295, for example, can manage the power of the electronic device 201. According to an embodiment, the power management module 295 can include a Power Management IC (PMIC), a charger IC, or a battery or fuel gauge, for example. The PMIC can have a wired and/or wireless charging method. The wireless charging method can include, for example, a magnetic resonance method, a magnetic induction method, or an electromagnetic method, and can further include an additional circuit for wireless charging, for example, a coil loop, a resonant circuit, or a rectifier circuit. The battery gauge can measure the remaining amount of the battery 296, or a voltage, current, or temperature of the battery 296 during charging. The battery 296 can include, for example, a rechargeable battery and/or a solar battery.

The indicator 297 can display a specific state of the electronic device 201 or part thereof (e.g., the processor 210), for example, a booting state, a message state, or a charging state. The motor 298 can convert electrical signals into mechanical vibration and generate a vibration or haptic effect. The electronic device 201 can include a mobile TV supporting device (e.g., a GPU) for processing media data according to standards such as Digital Multimedia Broadcasting (DMB), Digital Video Broadcasting (DVB), or MediaFLO™. Each of the above-mentioned components of the electronic device can be configured with at least one component and the name of a corresponding component can vary according to the kind of an electronic device. In various embodiments, an electronic device (e.g., the electronic device 201) can be configured including at least one of the above-mentioned components or another component, or not including some of the above-mentioned components. Additionally, some of components in an electronic device according various embodiments of the present disclosure are configured as one entity, so that functions of previous corresponding components are performed identically.

Figure 3:
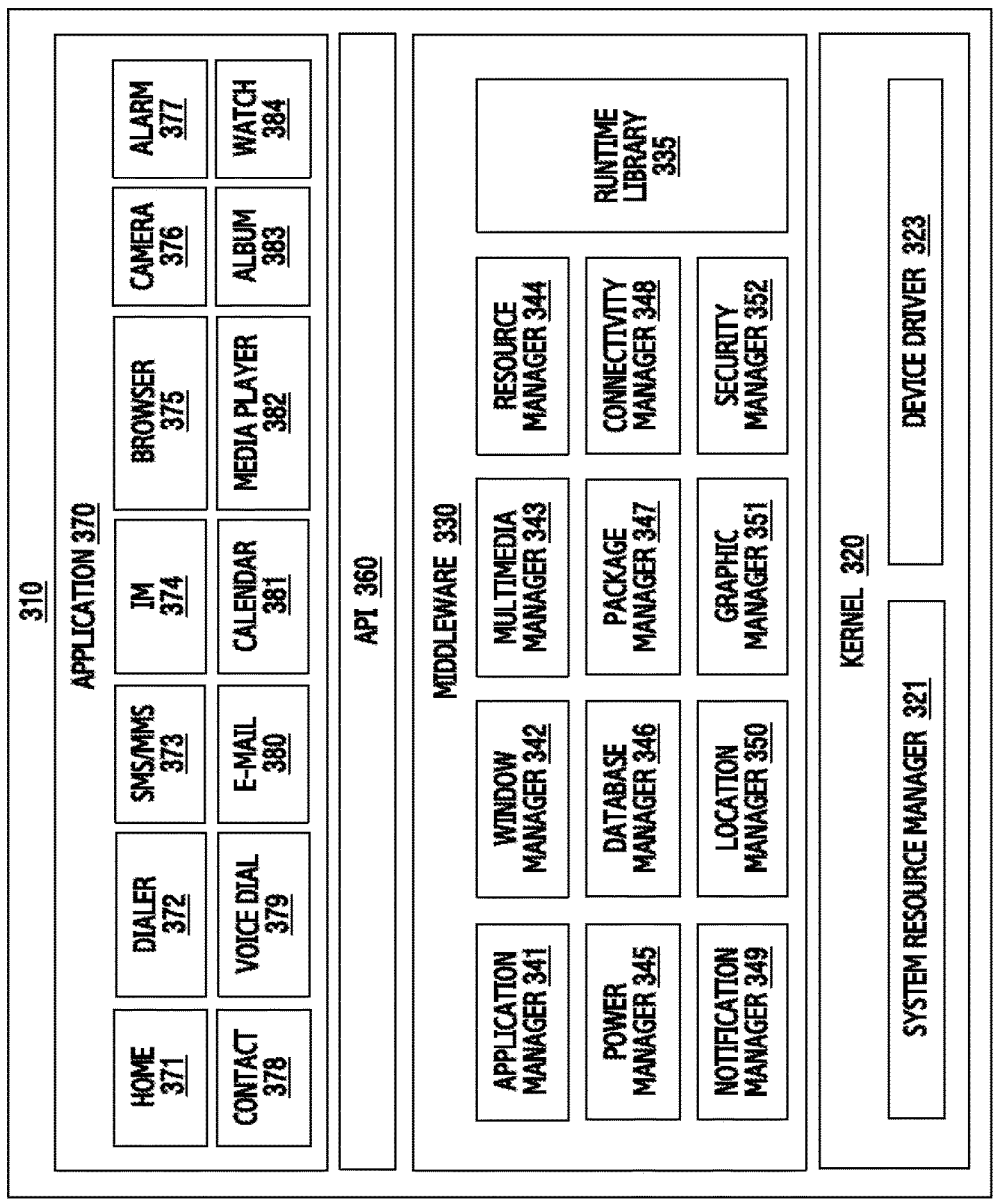
FIG. 3 illustrates a program module according to an embodiment of the present disclosure.

FIG. 3 illustrates a program module according to various embodiments of the present disclosure. The program module 310 (e.g., the program 140) can include an OS for controlling a resource relating to an electronic device (e.g., the electronic device 101) and/or various applications (e.g., the application program 147) running on the OS. The OS can include, for example, Android®, iOS™, Windows®, Symbian™, Tizen®, or Samsung Bada®. Referring to FIG. 3, the program module 310 can include a kernel 320 (e.g., the kernel 141), a middleware 330 (e.g., the middleware 143), an API 360 (e.g., the API 145), and/or an application 370 (e.g., the application program 147). At least part of the program module 310 can be preloaded on an electronic device or can be downloaded from an external electronic device (e.g., the electronic devices 102 and 104, a server 106).

The kernel 320 can include, for example, a system resource manager 321 and/or a device driver 323. The system resource manager 321 can control, allocate, or retrieve a system resource. According to an embodiment, the system resource manager 321 can include a process management unit, a memory management unit, or a file system management unit. The device driver 323 can include, for example, a display driver, a camera driver, a Bluetooth driver, a sharing memory driver, a USB driver, a keypad driver, a WiFi driver an audio driver, or an Inter-Process Communication (IPC) driver. The middleware 330, for example, can provide a function the application 370 utilizes commonly, or provide various functions to the application 370 through the API 360 in order to allow the application 370 to efficiently use a limited system resource inside the electronic device. The middleware 330 can include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 can include, for example, a library module used by a compiler to add a new function through a programming language while the application 370 is running. The runtime library 335 can manage input/output manage memory, or process an arithmetic function. The application manager 341, for example, can manage the life cycle of the applications 370. The window manager 342 can manage a GUI resource used in a screen. The multimedia manager 343 can recognize a format for playing various media files and encode or decode a media file by using the codec in a corresponding format. The resource manager 344 can manage a source code of the application 370 or a memory space. The power manager 345 can manage the battery or power of the battery and provide power information for an operation of the electronic device. The power manager 345 can operate together with a Basic Input/Output System (BIOS). The database manager 346 can create, search, or modify a database used in the application 370. The package manager 347 can manage installation or updating of an application distributed in a package file format.

The connectivity manger 348 can manage, for example, a wireless connection. The notification manager 349 can provide an event such as incoming messages, appointments, and proximity alerts to the user. The location manager 350 can manage location information of an electronic device. The graphic manager 351 can manage a graphic effect to be provided to the user or a user interface relating thereto. The security manager 352 can provide, for example, system security or user authentication. The middleware 330 can include a telephony manager for managing a voice or video call function of the electronic device, or a middleware module for combining various functions of the above-mentioned components. The middleware 330 can provide a module specialized for each type of OS. The middleware 330 can dynamically delete part of the existing components or add new components. The API 360, as a set of API programming functions, can be provided as another configuration according to OS. For example, in Android or iOS, one API set can be provided for each platform. In Tizen, at least two API sets can be provided for each platform.

The application 370 can include, for example, a home 371, a dialer 372, an SMS/MMS 373, an Instant Message (IM) 374, a browser 375, a camera 376 an alarm 377, a contact 378, a voice dial 379, an e-mail 380, a calendar 381, a media player 382, an album 383, a watch 384, health care (e.g., measure an exercise amount or blood sugar), or environmental information (e.g., air pressure, humidity, or temperature information) provision application. The application 370 can include an information exchange application for supporting information exchange between the electronic device and an external electronic. The information exchange application can include, for example, a notification relay application for relaying specific information to the external device or a device management application for managing the external electronic device. For example the notification relay application can relay notification information from another application of the electronic device to an external electronic device, or receive and forward notification information from an external electronic device to the user. The device management application, for example, can install, delete, or update a function (e.g., turn-on/turn off of the external electronic device itself (or some components) or display brightness (or resolution) adjustment) of an external electronic device communicating with the electronic device, or an application operating in the external electronic device. The application 370 can include a specified application a health care application of a mobile medical device) according to a property of the external electronic device. The application 370 can include an application received from an external electronic device. At least part of the program module 310 can be implemented (e.g., executed) with software, firmware, hardware (e.g., the processor 210), or a combination of at least two of them, and include a module, a program, a routine, a set of instructions, or a process for executing one or more functions.

The term "module" used in various embodiments of the present disclosure can imply a unit including hardware, software, and firmware or any suitable combination. The "module" can be interchangeably used with a term such as a unit, logic, a logical block, a component a circuit, and the like. The "module" can be a minimum unit of an integral component or can be a part thereof. The "module" can be a minimum unit for performing one or more functions or may be a part thereof. The "module" can be mechanically or electrically implemented. For example, the "module" according to various embodiments of the present disclosure can include at least one of an Application-Specific Integrated Circuit (ASIC) chip, a Field-Programmable Gate Arrays (FPGAs), and a programmable-logic device, which are known will be developed and which perform certain operations. At least some parts of a device (e.g., modules or functions thereof) or a method (e.g., operations) based on the various embodiments of the present disclosure can be implemented with an instruction stored in a non-transitory computer-readable storage medium (e.g., the memory 130) as a program module. When the instruction is executed by one or more processors (e.g., the processor 120), the one or more processors can perform a function corresponding to the instruction. The non-transitory computer readable recording medium can include, for example, a hard disk, a floppy disc, a magnetic medium (e.g., a magnetic tape), an optical storage medium (e.g., a Compact Disc-ROM (CD-ROM) or a DVD, a magnetic-optic medium (e.g., a floptical disc)), and an internal memory. The instruction can include code created by a compiler or code executable by an interpreter. The module or program module can further include at least one or more components among the aforementioned components, or can omit some of them, or can further include additional other components. Operations performed by a module, program module, or other components of the various embodiments of the present disclosure can be executed in a sequential, parallel, repetitive, or heuristic manner. In addition, some of the operations can be executed in a different order or may be omitted, or other operations may be added.

Figure 4:
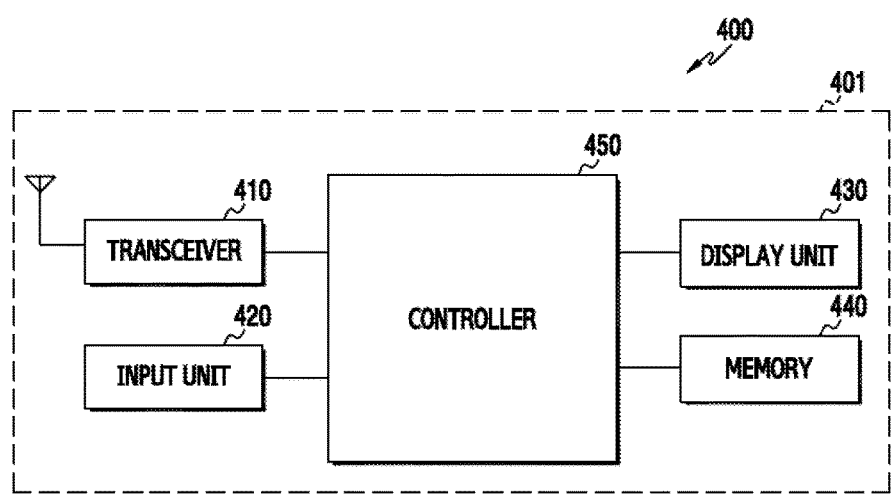
FIG. 4 illustrates the main configuration electronic device according to various embodiments of the present disclosure.

FIG. 4 illustrates the main configuration of an electronic device according to various embodiments of the present disclosure.

Refining to FIG. 4, the electronic device 400, according to the various embodiments of the present disclosure, may include a housing 401, and may include a transceiver 410 input unit 420, a display unit 430, a memory 440, and a controller 450.

The transceiver 410 may perform communication in the electronic device 400. The transceiver 410 may communicate with an external device (not shown) through various communication schemes. The transceiver 410 may perform at least one of wireless communication and wired communication. The transceiver 410 may access at least one of a mobile communication network and a data communication network. For example, the external device may include an electronic device, a base station, a server, and a satellite. The communication schemes may include Long Term Evolution (LTE), Wideband Code Division Multiple Access (WCDMA), Global System for Mobile Communications (GSM), WiFi®, Bluetooth®, and Near Field Communications (NFC).

The input unit 420 may generate input data in the electronic device 400. The input unit 420 may generate input data in response to an input of a user of the electronic device 400. The input unit 420 may include at least one input means. The input unit 420 may include a key pad, a dome switch, a physical button, a touch panel, and a jog & shuttle. The touch panel may sense coordinate information relating to a motion thereon, which may be, for example, a touch by a user's finger and may transfer the coordinate information to the controller 450.

The display unit 430 may display content. The display unit 430 may display a part of content larger than the display unit 430 according to the control of the controller 450. The display unit 430 may include a Liquid Crystal Display (LCD), a Light Emitting Diode (LED) display, an Organic LED (OLED) display, a Micro Electro Mechanical System (MEMS) display, and an electronic paper display. The display unit 430 may include a plurality of light emitting diodes. The display unit 430, together with the input unit 420, may be implemented as a touch screen. The display unit 430, implemented as the touch screen, may transfer, to the controller 450, coordinate information relating to a motion (for example, hovering or a touch by a user's hand or finger) that is detected on the surface of the display unit 430.

The memory 440 may store operating programs of the electronic device 400. The memory 440 may store a program for shifting the content displayed on the display unit 430 according to a user input. The memory 440 may store a shift direction determination area. The shift direction determination area may include an area that forms the basis for setting the direction in which the content is to be shifted to a vertical area, a horizontal area, or a diagonal area.

The controller 450 may control the overall operation of the electronic device 400 and may be the same as the processors 120 and 210, which are shown in FIGS. 1 and 2. When a touch event is generated on the display unit 430, the controller 450 may identify whether the event is a touch down event or a touch move event. The controller 450 may set the first coordinate value relating to the touch point corresponding to a touch down event as a reference point. The controller 450 may set at least one shift direction determination area based on the reference point. The controller 450 may identify the touch point corresponding to a touch move event, which is generated on the display unit 430 after the touch down event, to be the second coordinate value. The controller 450 may set the direction in which the content displayed on the display unit 430 is to be shifted based on the set shift direction determination area and the second coordinate value. The controller 450 may shift the content in the direction set by the touch move event that is generated after the setting of the direction in which the content is to be shifted.

When the touch move event (e.g., a drag) is generated on the display unit 430, the controller 450 may identify the touch point corresponding to the touch move event periodically (e.g., in 16 ohms periods) from the time the touch down event is generated to the time a touch release event is generated. According to an embodiment of the present disclosure, the controller 450 may set the touch point corresponding to the touch down event, which serves as a reference point for setting the direction in which the content is to be shifted, as the first coordinate value $(x_0, y_0)$ before the touch move event is generated. The controller 450 may set the touch point corresponding to the touch move event, which is detected between the first coordinate value and the time the touch release event is generated, as the second coordinate value $(x_n, y_n)$. The second coordinate value may be updated while the touch move event is generated.

The first coordinate value may be updated in some cases. For example, the first coordinate value may be updated to reset the direction in which the content is to be shifted in a case where the second coordinate value is beyond the content shift reference area on the basis of which the content is shifted, or in a case where the touch move event does not move for a predetermined period of time or does not depart from a predetermined area for a predetermined period of time.

According to an embodiment, when a touch event generated on the display unit 430 is a touch down event, the controller 450 may set the touch point corresponding to the event as the first coordinate value $(x_0, y_0)$. The controller 450 may set a shift direction determination area based on the first coordinate value.

The controller 450 may define the vertical axis (hereinafter, referred to as the y-axis) and the horizontal axis (hereinafter, referred to as the x-axis) that extend from the first coordinate value $(x_0, y_0)$ and are perpendicular to each other. The controller 450 may set the first dividing line that is separated by a specified distance (e.g., a first threshold value K) from the first coordinate value $(x_0, y_0)$ along the y-axis and is inclined relative to the y-axis. The controller 450 may set the second dividing line that is separated from the first coordinate value $(x_0, y_0)$ by the first threshold value K along the x-axis and is inclined relative to the x-axis. The first dividing line and the second dividing line may be set parallel to each other. The controller 450 may set the first threshold value K in order to set the first dividing line and the second dividing line. The controller 450 may set the third dividing line on the basis of which the content is shifted. The controller 450 may set a specified distance (e.g., a second threshold value S) from the first coordinate value $(x_0, y_0)$ along the y-axis and x-axis in order to set the third dividing line. The controller 450 may shift the content when the second coordinate value is beyond the third dividing line.

The controller 450 may set the first coordinate value and may set the TouchCount to 0. The controller 450 may set the direction in which the content is to be shifted to a default value (e.g., diagonal direction).

When a touch event is a touch move event, the controller 450 may compute a variation $(\Delta x, \Delta y)$ in the location between the first coordinate value $(x_0, y_0)$ and the second coordinate value that is identified by the touch move event. The controller 450 may increase the TouchCount by 1 when the direction in which the content is to be shifted is set to the default value (e.g., diagonal direction), when the Touch-Count is smaller than the threshold value T, and when the variation in location in the x-axis direction or the variation in location in the y-axis direction is beyond the threshold area.

The controller 450 may set the direction in which the content is to be shifted to a vertical direction when the value obtained by subtracting the variation in location in the x-axis direction from the variation in location in the y-axis direction is greater than the first threshold value K. The controller 450 may set the direction in which the content is to be shifted to a horizontal direction when the value obtained by subtracting the variation in location in the y-axis direction from the variation in location in the x-axis direction is greater than the first threshold value K.

According to an embodiment, when a touch event generated on the display unit 430 is a touch down event, the controller 450 may set the touch point corresponding to the event as the first coordinate value $(x_0, y_0)$. The controller 450 may set a shift direction determination area based on the first coordinate value.

The controller 450 may define the vertical axis (hereinafter, referred to as the y-axis) and the horizontal axis (hereinafter, referred to as the x-axis) that extend from the first coordinate value $(x_0, y_0)$ and are perpendicular to each other. The controller 450 may set the first dividing line which is a parabolic curve that is separated by a specified distance (e.g., a first threshold value K) from the first coordinate value $(x_0, y_0)$ along the y-axis and is symmetric with respect to the y-axis based on the first threshold value K. The controller 450 may set the second dividing line, which is a parabolic curve that is separated from the first coordinate value $(x_0, y_0)$ by the first threshold value K along the x-axis and is symmetric with respect to the x-axis based on the first threshold value K. The first dividing line and the second dividing line may be set by a quadratic inequality. In the present disclosure, the first dividing line and the second dividing line are set by a quadratic inequality, merely for the convenience of description, but may also use at least one of an exponential function and a logarithmic function without being limited thereto. The controller 450 may set the third dividing line on the basis of which the content is shifted. The controller 450 may set a specific distance (e.g., a second threshold value S) from the first coordinate value $(x_0, y_0)$ along the y-axis and the x-axis in order to set the third dividing line. The controller 450 may shift the content when the second coordinate value is beyond the third dividing line.

According to an embodiment, the controller 450 may set the first coordinate value and may set the Touchcount to 0. The controller 450 may set the direction in which the content is to be shifted to a default value (e.g., diagonal direction).

When a touch event is a touch move event, the controller 450 may compute a variation $(\Delta x, \Delta y)$ in location between the first coordinate value $(x_0, y_0)$ and the second coordinate value that is identified by the touch move event. The controller 450 may increase the TouchCount by 1 when the direction in which the content is to be shifted is set to the default value (e.g., diagonal direction), the TouchCount is smaller than the threshold value T, and the variation in location in the x-axis direction or the variation in location in the y-axis direction is beyond the threshold area.

The controller 450 may set the direction in which the content is to be shifted to a vertical direction when the sum of the first threshold value K and an arbitrary coefficient times the square of the variation in location in the x-axis direction is less than the variation in location in the y-axis direction. The controller 450 may set the direction in which the content is to be shifted to a horizontal direction when the sum of the first threshold value K and an arbitrary coefficient times the square of the variation in location in the y-axis direction is less than the variation in location in the x-axis direction.

According to an embodiment, when a touch event generated on the display unit 430 is a touch down event the controller 450 may set the touch point corresponding to the event as the first coordinate value $(x_0, y_0)$. The controller 459 may set a shift direction determination area based on the first coordinate value $(x_0, y_0)$. The controller 450 may change and set the threshold area included in the shift direction determination area. The controller 450 may set a threshold area, for example, a circle with the center at the first coordinate value $(x_0, y_0)$ and the radius of a threshold value. The circle may refer to the minimum distance by which the direction of shift of the content may be set based on a touch move event input.

The controller 450 may set the first and second dividing lines that start from two arbitrary points on each quadrant obtained by dividing the circle by the y-axis and the x-axis. The first and second dividing lines may be curved lines. The first and second dividing lines may be set by particular mathematical equations, which will be described using Equations 3 and 4 below.

According to an embodiment, when a touch event generated on the display unit 430 is a touch down event, the controller 450 may set the touch point corresponding to the event as the first coordinate value $(x_0, y_0)$. The controller 450 may set the TouchCount to 0. The controller 450 may set the direction in which the content is to be shifted to a diagonal direction. The controller 450 may set the direction in which the content is to be shifted to be changeable.

When a touch event is a touch move event, the controller 450 may compute a variation $(\Delta x, \Delta y)$ in location between the first coordinate value $(x_0, y_0)$ and the second coordinate value $(x_n, y_n)$ that is identified by the touch move event.

The controller 450 may set the direction in which the content is to be shifted to a vertical, horizontal, or diagonal direction by identifying: the result obtained by comparing the sum of the square of the variation in location in the x-axis direction and the square of the variation in location in the y-axis direction with the square of the threshold value K; whether the direction in which the content is to be shifted is changeable; and the area in which the variation in location in the x-axis direction and the variation in location in the y-axis direction are involved.

An electronic device, according to an embodiment of the present disclosure, may include: a housing 401; a touch screen (e.g., the display unit 430) disposed on one side of the housing 401 and having a first edge extending in a first direction and a second edge extending in a second deletion that is substantially perpendicular to the first direction; a processor (e.g., the controller 450) electrically connected to the touch screen 430; and a memory (e.g., the memory 440) electrically connected to the processor 450, wherein the memory 440 may store instructions that allow the processor 450, when being executed, to: display a screen on the touch screen 430; receive a gesture input, through the touch screen 430, which has first coordinates and second coordinates; acquire a first shift value in the first direction and a second shift value in the second direction based on the shift of the gesture input from the first coordinates to the second coordinates; shift the screen in the first direction when the first shift value is greater than a first determination value that is computed based on the square of the second shift value; shift the screen in the second direction when the second shift value is greater than a second determination value that is computed based on the square of the first shift value; and move the screen in a third direction between the first and second directions when the first shift value is smaller than, or equal to, the first determination value and the second shift value is smaller than, or equal to, the second determination value.

According to an embodiment, an electronic device that shifts content may include: a display unit 430 that displays the content; and a controller 450 that sets a first coordinate value for a touch as a reference point, sets at least one shift direction determination area based on the reference point, identifies a second coordinate value for the touch, sets the direction in which the content is to be shifted based on the shift direction determination area and the second coordinate value; and shifts the content in the set shift direction.

The controller 450 may set the shift direction determination area to a vertical area or a horizontal area. The controller 450 may: set the direction in which the content is to be shifted to a vertical direction when the second coordinate value is involved in the vertical area; set the direction in which the content is to be shifted to a horizontal direction when the second coordinate value is involved in the horizontal area; and set the direction in which the content is to be shifted to a diagonal direction when the second coordinate value is involved in a diagonal area.

The controller 450 may define the vertical axis and the horizontal axis that extend from the reference point and are perpendicular to each other and may set the shift direction determination area according to a first dividing line and a second dividing line, wherein the first dividing line is separated a predetermined distance from the reference point along the horizontal axis and is inclined relative to the horizontal axis, and the second dividing line is separated a specified distance from the reference point along the vertical axis and is inclined relative to the vertical axis.

The controller 450 may count detected touch events when the second coordinate value is beyond a threshold area. The controller 450 may identify the second coordinate value for the touch and may set the direction in which the content is to be shifted by using the second coordinate value when the number of detected touch events is smaller than a threshold value.

The controller 450 may define the vertical axis and the horizontal axis that extend from the reference point and are perpendicular to each other and may set the shift direction determination area according to a first dividing line and a second dividing line, wherein the first dividing line is a parabolic curve that is separated a specified distance from the reference point along the vertical axis and is symmetric with respect to the vertical axis based on the coordinates at the specified distance from the reference point, and the second dividing line is a parabolic curve that is symmetric with respect to the horizontal axis based on the coordinates at the specified distance from the reference point.

The controller 450 may set the first and second dividing lines by at least one of an exponential function and a logarithmic function.

The controller 450 may set a circle with the center at the reference point, which is a threshold area, and may set the shift direction determination area based on first and second dividing lines that are two curves starting from two points on the circumference of the circle.

The controller 450 may set the direction which the content is to be shifted by using the second coordinate value when the second coordinate value is beyond the threshold value.

The controller 450 may display a part of the content on the display unit 430.

Figure 5:
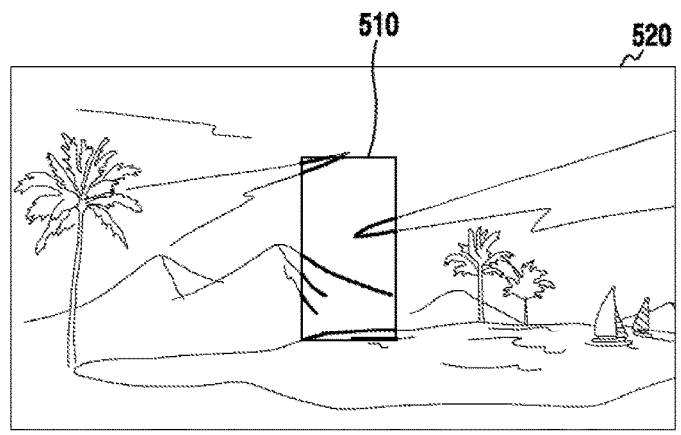
FIG. 5 illustrates a display unit of an electronic device and content displayed through the display unit, according to various embodiments of the present disclosure.
Figure 6:
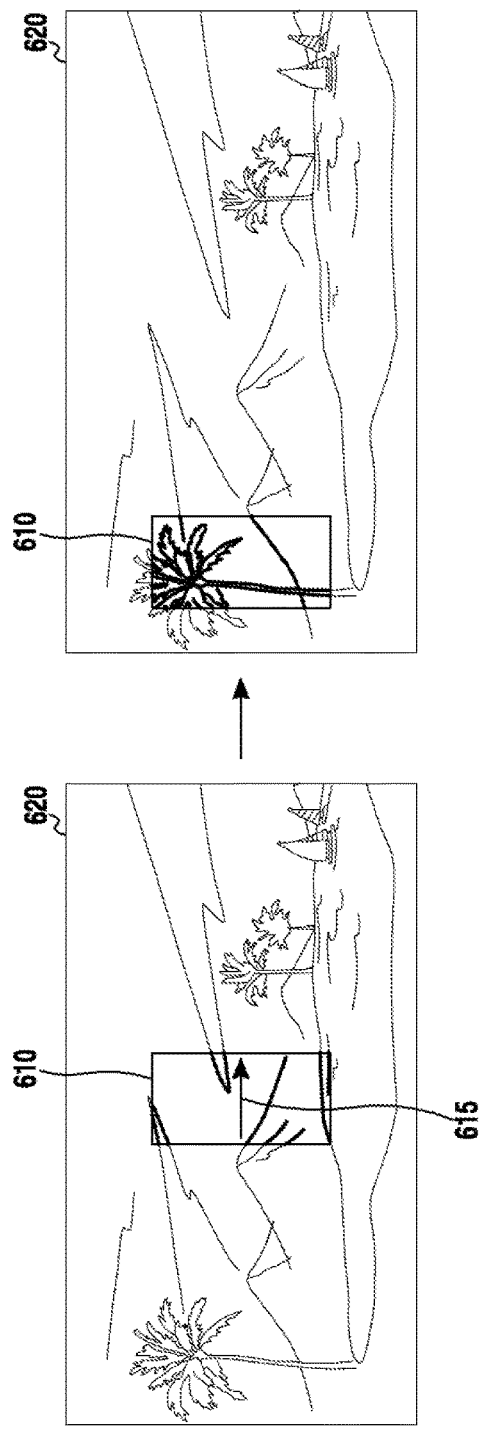
FIG. 6 illustrates a process of shifting content in a horizontal direction, according to various embodiments of the present disclosure.
Figure 7:
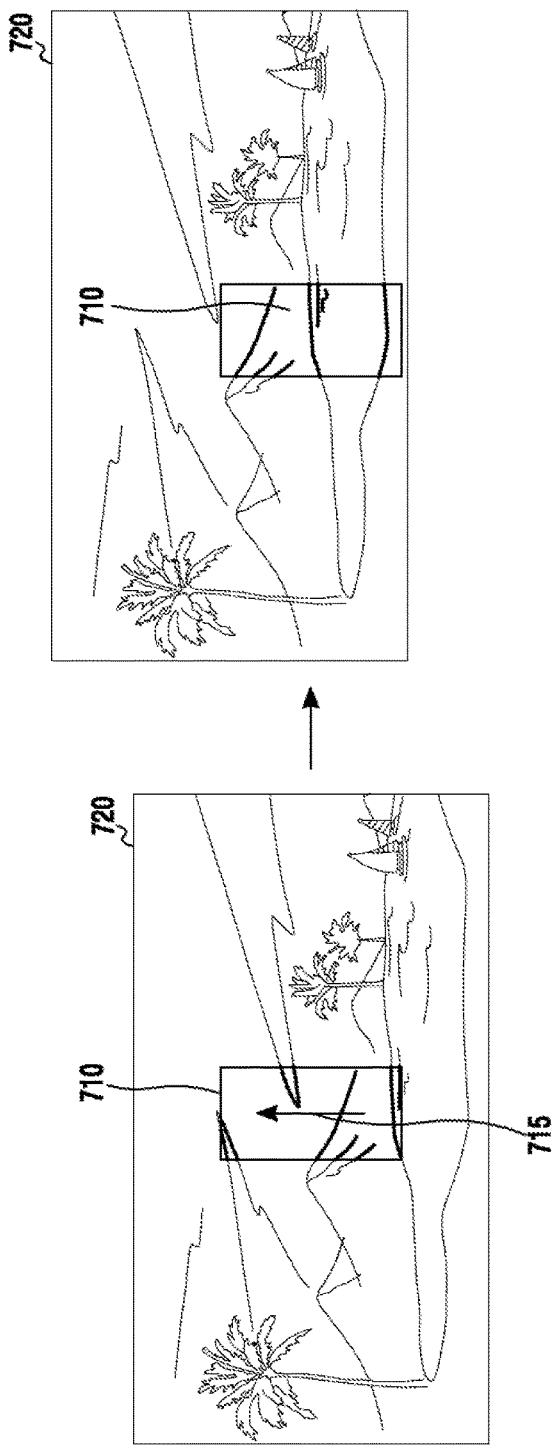
FIG. 7 is an illustrates a process of shifting content in a vertical direction, according to various embodiments of the present disclosure.
Figure 8:
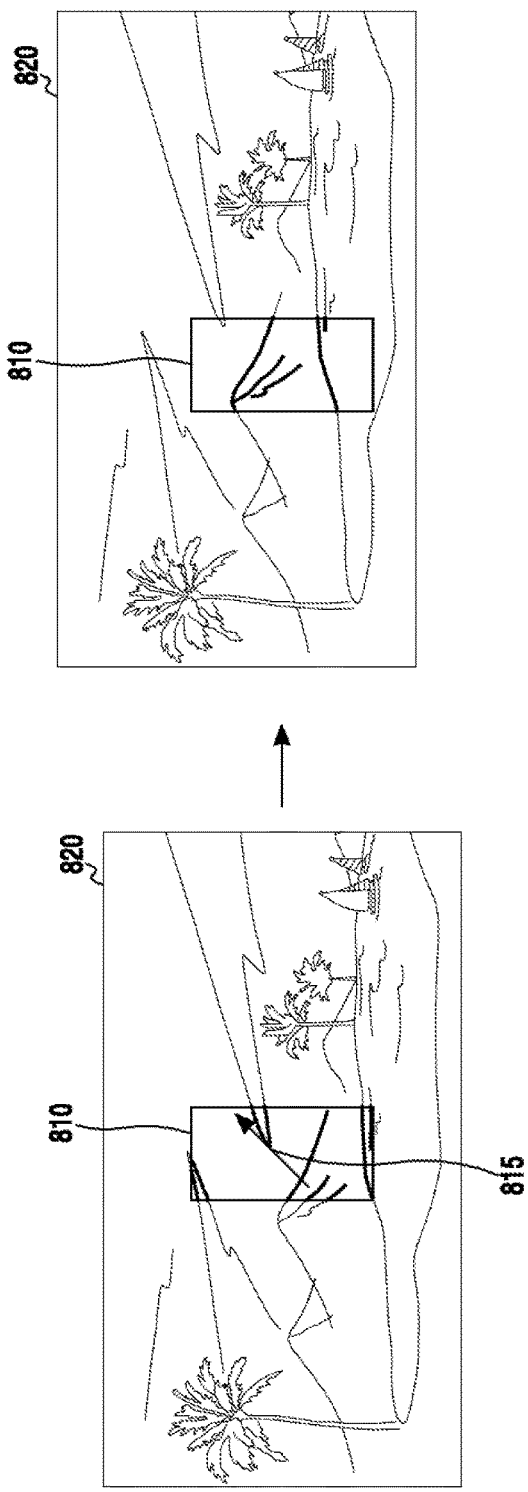
FIG. 8 illustrates a process of shifting content in a diagonal direction, according various embodiments of the present disclosure.

FIG. 5 illustrates a display unit of an electronic device and content displayed through the display unit, according to various embodiments of the present disclosure. FIG. 6 illustrates a process of shifting content in a horizontal direction, according to various embodiments of the present disclosure. FIG. 7 illustrates a process of shifting content in a vertical direction, according to various embodiments of the present disclosure. FIG. 8 illustrates a process of shifting content in a diagonal direction, according to various embodiments of the present disclosure.

Referring to FIG. 5, the controller 450 may display a part of the content 520 on a display unit 510.

Referring to FIG. 6, a user may touch a display unit 610 in order to scroll content 620 in the right direction 615. When a touch event is continually detected in the right direction 615 after the touch, the controller 450 may shift the content 620 in the right direction 615 to display a part of the content 620 on the display unit 610. The controller 450 may shift the content 620 from the location where the touch event passes through an arbitrary point (e.g., slope).

Referring to FIG. 7, a user may touch a display unit 710 in order to scroll content 720 in the upward direction 715. When a touch event is continually detected in the upward direction 715 after the touch, the controller 450 may shift the content 720 in the upward direction 715 to display a part of the content 720 on the display unit 710.

Referring to FIG. 8, a user may touch a display unit 810 in order to scroll content 820 in an upward diagonal direction 815. When a touch event is continually detected in the upward diagonal direction 815 after the touch, the controller 450 may shift the content 820 in the upward diagonal direction 815 to display a part of the content 820 on the display unit 810.

Figure 9:
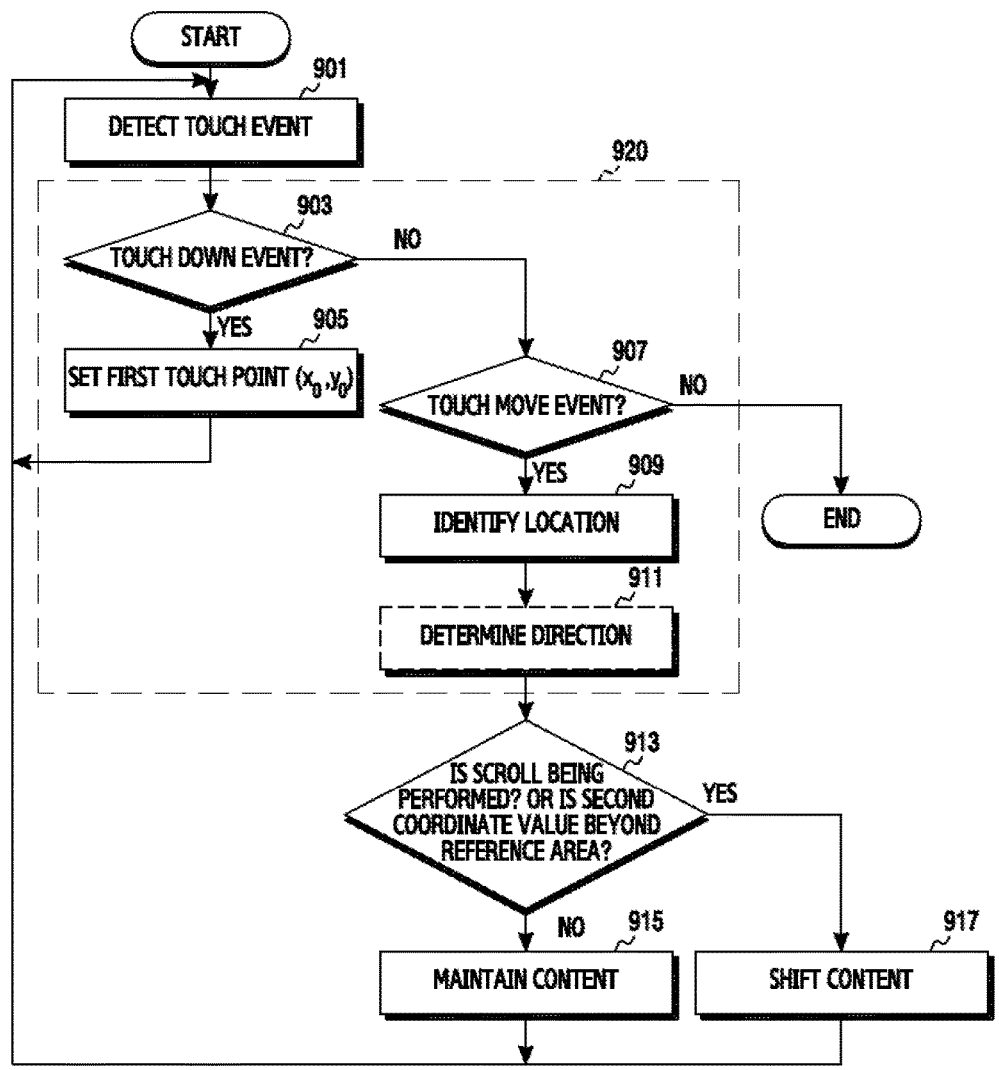
FIG. 9 illustrates a method of shifting content according to various embodiments of the present disclosure.

FIG. 9 illustrates a method of shifting content according to various embodiments of the present disclosure. A touch down event used in the various embodiments of the present disclosure may refer to an event in which a touch is first generated on the display unit 430. A touch move event may be generated by a drag on the display unit 430. A touch release event may mean that the object (e.g., a user's finger, a touch pen, etc.) by which the touch down event and the touch move event were generated departs from the display unit 430.

The controller 450 may identify a touch point corresponding to a touch move event periodically (e.g., in 16 ms periods) from the time a touch down event is generated to the time a touch release event is generated. In the embodiments of the present disclosure, the touch point corresponding to the touch down event may be denoted by the first coordinate value (x0, y0). The touch point corresponding to the touch move event, which is periodically detected from the time the touch down event is generated to the time the touch release event is generated, may be denoted by the second coordinate value $(x_n, y_n)$.

Referring to FIG. 9, when a touch event is detected, in operation 901, on the display unit 430 of FIG. 4 on which a part of the content is displayed, the controller 450 of FIG. 4 may perform operation 903. In operation 903, the controller 450 may identify whether the detected touch event is a touch down event or not. When it is identified in operation 903 that the touch event is a touch down event, the controller 450 may perform operation 905. In operation 905, the controller 450 may set the touch point corresponding to the touch down event as the first coordinate value $(x_0, y_0)$. The controller 450, after setting the first coordinate value, may return to operation 901 to update the first coordinate value based on a touch down event to be generated.

When it is identified in operation 903 that the detected touch event is not a touch down event, the controller 450 may, in operation 907, identify whether the detected touch event is a touch move event or not. When it is identified in operation 907 that the touch event is a touch move event, the controller 450 may perform operation 909. When it is identified in operation 907 that the touch event is not a touch move event, the controller 450 may end the process.

In operation 909, the controller 450 may identify the touch point corresponding to the touch move event. In operation 911, based on the identified touch point, the controller 450 may determine the direction in which the content is to be shifted. The operations 903 to 911 will be described in detail as operation 920 in the embodiments shown in FIGS. 10, 12, and 14.

When it is identified in operation 913 that a scroll is continually performed by the touch move event, or the second coordinate value is beyond a shift reference area for detecting whether the content is shifted or not, the controller 450 may perform operation 917. In operation 917, the controller 450 may shift the content according to the touch move event.

When it is identified in operation 913 that a scroll is not continually performed by the touch move event, or the second coordinate value is not beyond the shift reference area, the controller 450 may perform operation 915. In operation 915, the controller 450 may maintain the content at the location where the content is displayed on the display unit 430.

Figure 10:
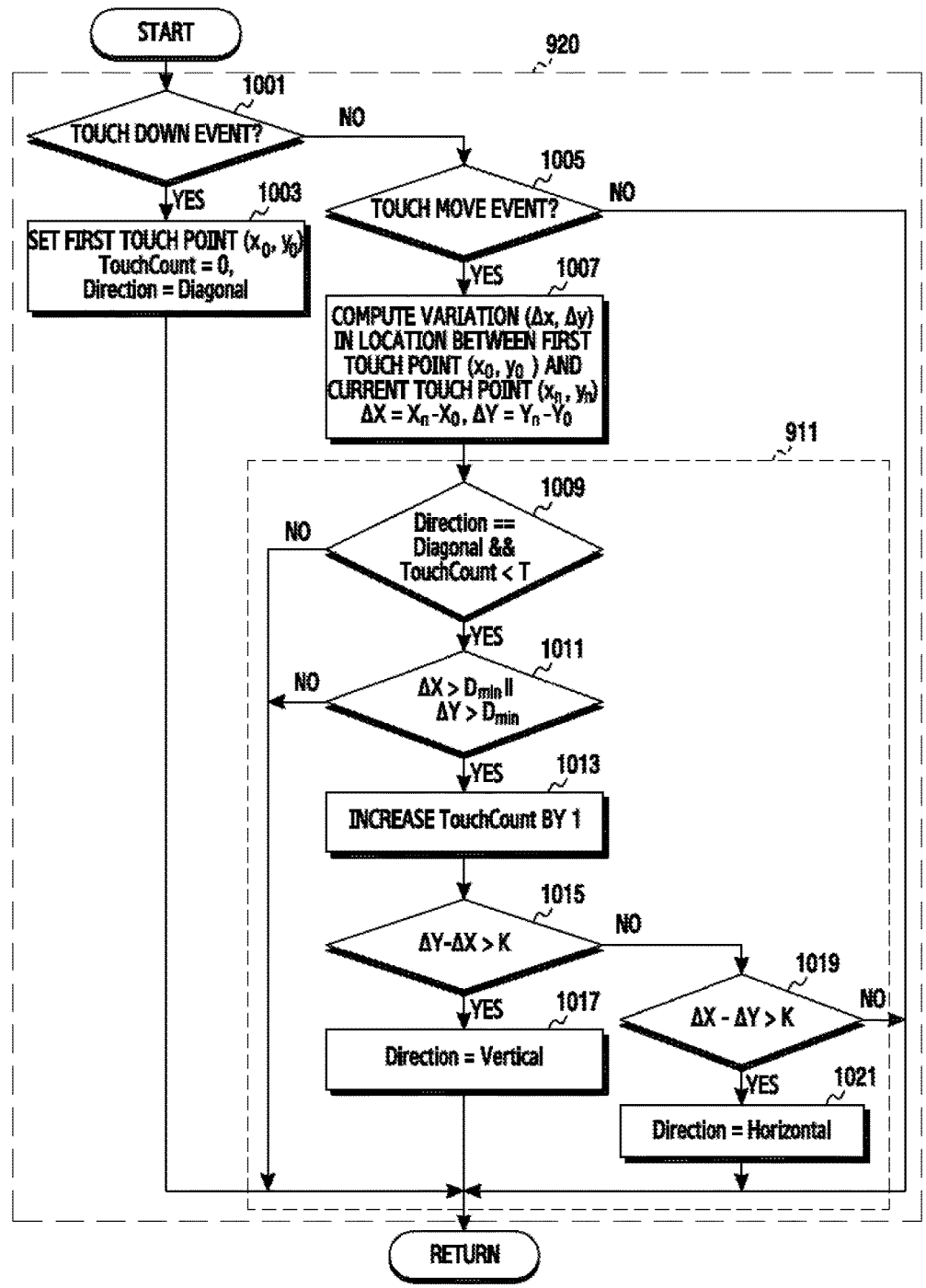
FIG. 10 illustrates a method of setting the direction in which content is to be shifted, according to an embodiment of the present disclosure.
Figure 11:
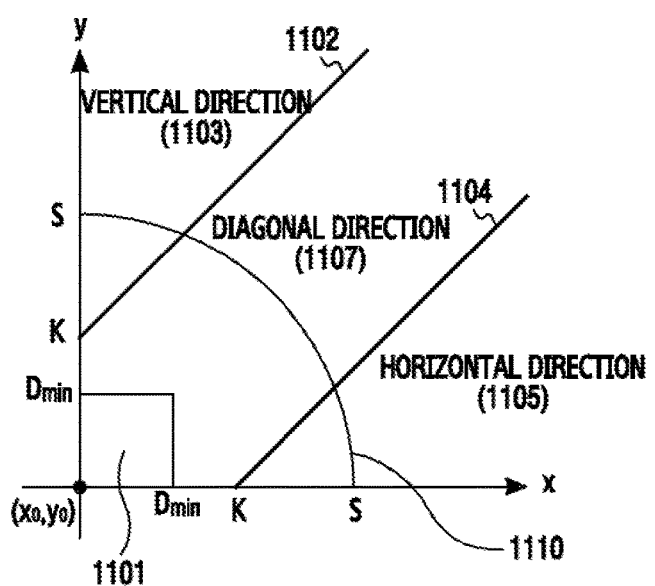
FIG. 11 illustrates a method of setting a shift direction determination area, according to an embodiment of the present disclosure.

An operation in which the controller 450 of FIG. 4 controls the setting of the direction in which the content is to be shifted, according to an embodiment, will be described in more detail with reference to FIGS. 10 and 11. FIG. 10 illustrates a method of setting the direction in which the content is to be shifted, according to an embodiment of the present disclosure. FIG. 11 illustrates a method of setting a shift direction determination area, according to an embodiment of the present disclosure.

Referring to FIGS. 10 and 11, in operation 1001, the controller 450 may identify whether the touch event detected in operation 901 of FIG. 9 is a touch down event or not. When it is identified in operation 1001 that the touch event is a touch down event, the controller 450 may perform operation 1003. In operation 1003, the controller 450 may set the touch point corresponding to the touch down event as the first coordinate value $(x_0, y_0)$. In operation 1003, the controller 450 may set the TouchCount to 0. In operation 1003, the controller 450 may set the direction in which the content is to be shifted to a default value (e.g., diagonal direction). The controller 450, after setting the direction in which the content is to be shifted to the diagonal direction, may perform the operation 913 of FIG. 9.

According to various embodiments of the present disclosure, as shown in FIG. 11, the controller 450 may define the vertical axis (hereinafter, referred to as the y-axis) and the horizontal axis (hereinafter, referred to as the x-axis) that extend front the first coordinate value $(x_0, y_0)$ and are perpendicular to each other. The controller 450 may set the first dividing line 1102 that is separated a specified distance (hereinafter, referred to as the first threshold value K) from the first coordinate value $(x_0, y_0)$ along the y-axis and is inclined relative to the y-axis. The controller 450 may set the second dividing line 1104 that is separated from the reference point $(x_0, y_0)$ by the first threshold value K along the x-axis and is inclined relative to the x-axis. The first dividing line 1102 and the second dividing line 1104 may be set parallel to each other. The controller 450 may set the first threshold value K in order to set the first dividing line 1102 and the second dividing line 1104. The controller 450 may set the third dividing line 1110 on the basis of which the content is shifted. The controller 450 may set a specified distance (hereinafter, referred to as the second threshold value S) from the reference point ($x_0$, $y_0$) along the y-axis and x-axis in order to set the third dividing line 1110. The controller 450 may shift the content when the second coordinate value is beyond the third dividing line 1110.

According to an embodiment, the first threshold value K, on the basis of which the direction of shift of the content is set, may be set to be smaller than, or equal to, the second threshold value S, on the basis of which the content is shifted. The first threshold value K and the second threshold value S may be regulated based on the resolution of the display of the electronic device or the nature of the touch panel.

The controller 450 may set the area that is in contact with the first dividing line 1102 and the y-axis as a vertical area 1103. The controller 450 may set the area that is in contact with the second dividing line 1104 and the x-axis as a horizontal area 1105. The controller 450 may set the area that is in contact with the first dividing line 1102 and the second dividing line 1104 as a diagonal area 1107. The controller 450 may set a rectangle with sides of $D_{min}$, which is smaller than the first threshold value K, along the x-axis and y-axis as a threshold area 1101. The first threshold value K, the second threshold value S, and $D_{min}$ may be specified values.

$D_{min}$ may refer to a distance by which a touch is determined to depart from the reference point by a user's motion, or the boundary of a motion event that is generated when the user touches the same point. $D_{min}$ may refer to the minimum distance that forms the basis for determination as to whether a touch generated by the user corresponds to a coordinate value at an error level, which is generated without the user's intended motion. Accordingly, when a touch move event generated on the display unit 430 is beyond the threshold area 1101, the controller 450 may identify the direction in which the touch move event moves.

When it is identified in operation 1001 that the touch event is not a touch down event, the controller 450 may perform operation 1005. In operation 1005, the controller 450 may identify whether the touch event is a touch move event or not. The controller 450 may perform operation 1007 when it is identified in operation 1005 that the touch event is a touch move event, and may performing the operation 913 of FIG. 9 when not.

In operation 1007, the controller 450 may compute a variation ($\Delta x$, $\Delta y$) in location between the first coordinate value ($x_0$, $y_0$) and the second coordinate value that is identified by the touch move event.

The controller 450 may perform operation 1011 when it is identified in operation 1009 that the direction in which the content is to be shifted corresponds to a diagonal direction and the TouchCount is smaller than a threshold value T. The controller 450 may perform the operation 913 of FIG. 9 when it is identified in operation 1009 that the direction which the content is to be shifted does not correspond to a diagonal direction or the TouchCount is not smaller than the threshold value T.

The controller 450 may perform operation 1013 when it is identified in operation 1011 that the variation in location in the x-axis direction is greater than $D_{min}$ or the variation in location in the y-axis direction is greater than $D_{min}$. The controller 450 may perform the operation 913 of FIG. 9 when it is identified in operation 1011 that the variation in location in the x-axis direction is not greater than $D_{min}$ or the variation in location in the y-axis direction is not greater than $D_{min}$. The controller 450 may increase the TouchCount by 1 in operation 1013 and may then perform operation 1015. The controller 450 may perform operation 1017 when it is identified in operation 1015 that the value obtained by subtracting the variation ($\Delta x$) in location in the x-axis direction from the variation ($\Delta y$) in location in the y-axis direction is greater than the first threshold value K. In operation 1017, the controller 450 may identify that the second coordinate value is involved in the vertical area 1103 and may set the direction in which the content is to be shifted to a vertical direction.

The controller 450 may perform operation 1019 when it is identified in operation 1015 that the value obtained by subtracting the variation ($\Delta x$) in location in the x-axis direction from the variation ($\Delta y$) in location in the y-axis direction is not greater than the first threshold value K. The controller 450 may perform operation 1021 when it is identified in operation 1019 that the value obtained by subtracting the variation ($\Delta y$) in location in the y-axis direction from the variation ($\Delta x$) in location in the x-axis direction is greater than the first threshold value K. In operation 1021, the controller 450 may identify that the second coordinate value is involved in the horizontal area 1105 and may set the direction in which the content is to be shifted to a horizontal direction. The controller 450 may perform the operation 913 of FIG. 9 when it is identified in operation 1019 that the value obtained by subtracting the variation ($\Delta y$) in location in the y-axis direction from the variation ($\Delta x$) in location in the x-axis direction is less than the first threshold value K. Operations 1009 to 1021 correspond to the details of the operation 911 shown in FIG. 9. The operation 903 of FIG. 9 corresponds to operation 1001 of FIG. 10 and operation 1201 of FIG. 12. The operation 905 of FIG. 9 corresponds to operation 1003 of FIG. 10 and operation 1203 of FIG. 12. The operation 907 of FIG. 9 corresponds to operation 1005 of FIG. 10 and operation 1205 of FIG. 12. The operation 909 of FIG. 9 corresponds to operation 1007 of FIG. 10 and operation 1207 of FIG. 12.

Figure 12:
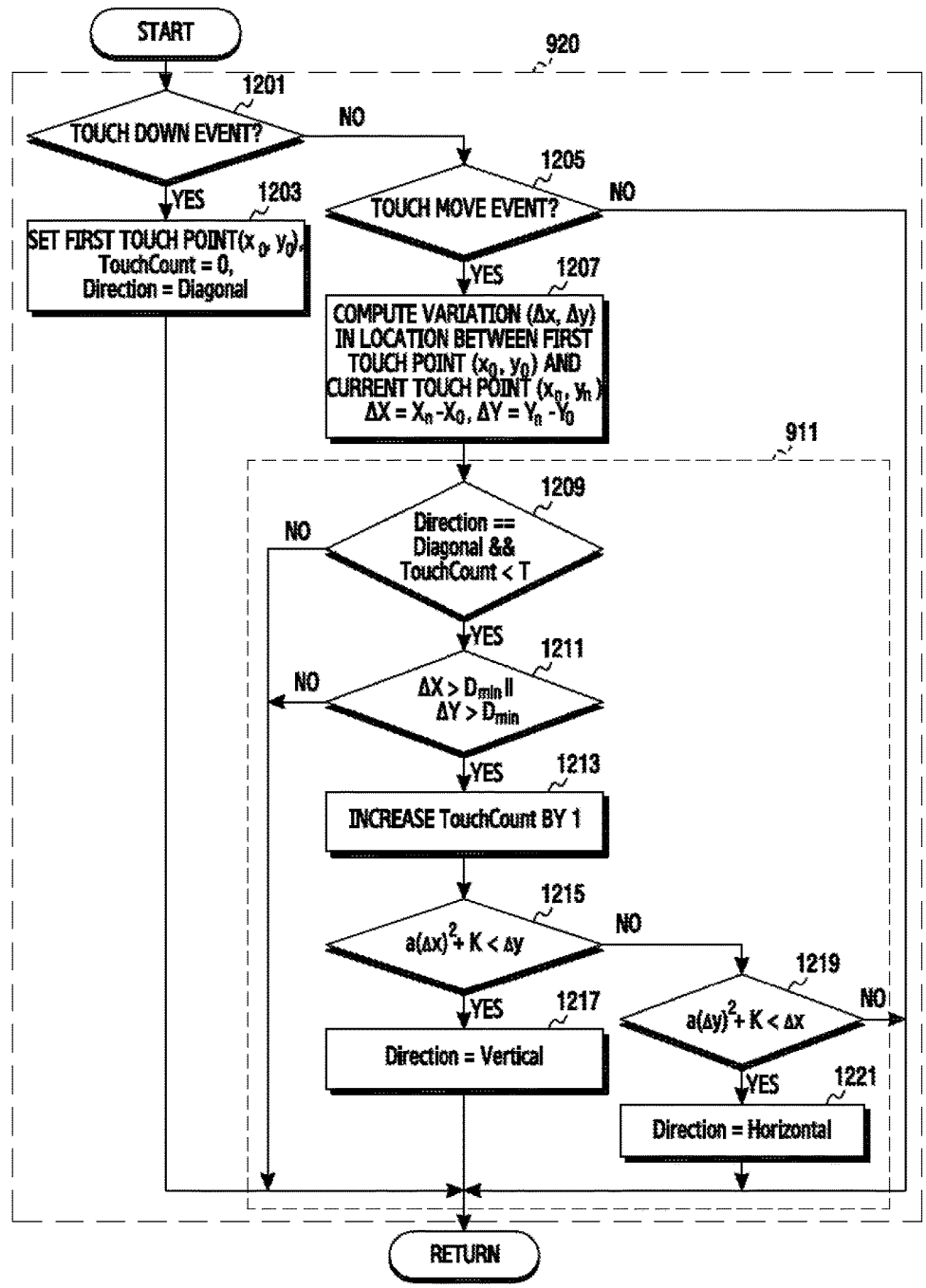
FIG. 12 illustrates a method of setting the direction in which content is to be shifted, according to another embodiment of the present disclosure.
Figure 13:
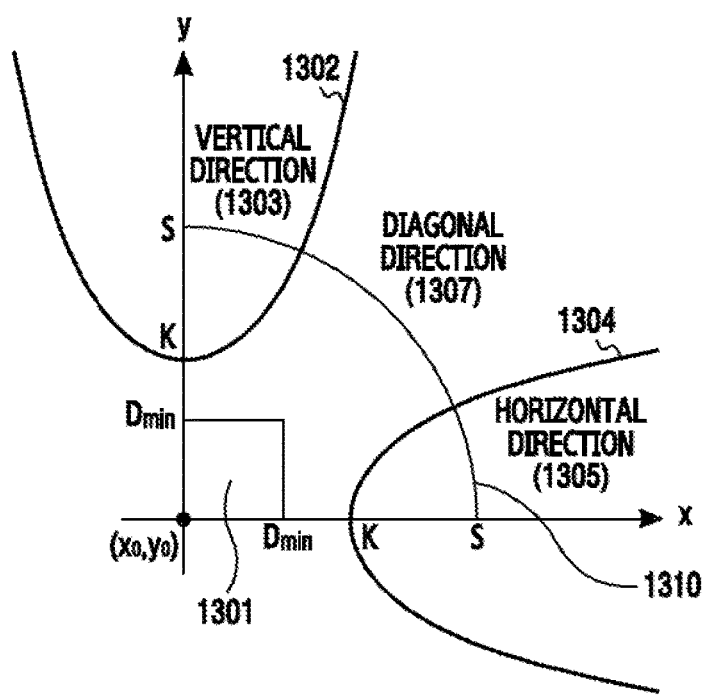
FIG. 13 illustrates a method of setting a shift direction determination area, according to another embodiment of the present disclosure.

An operation in which the controller 450 of FIG. 4 controls the setting of the direction in which content is to be shifted, according to another embodiment, will be described in more detail with reference to FIGS. 12 and 13. FIG. 12 illustrates a method of setting the direction in which content is to be shifted, according to another embodiment of the present disclosure. FIG. 13 illustrates a method of setting a shift direction determination area, according to another embodiment of the present disclosure.

Referring to FIGS. 12 and 13, in operation 1201, the controller 450 may identify whether the touch event detected in operation 901 of FIG. 9 is a touch down event or not. When it is identified in operation 1201 that the touch event is a touch down event, the controller 450 may perform operation 1203. In operation 1203, the controller 450 may set the touch point corresponding to the touch down event as the first coordinate value ($x_0$, $y_0$). In operation 1203, the controller 450 may set the TouchCount to 0. In operation 1203, the controller 450 may set the direction in which the content is to be shifted to a diagonal direction. The controller 450, after setting the direction in which the content is to be shifted to the diagonal direction, may perform the operation 913 of FIG. 9.

As shown in FIG. 13, the controller 450 may define the vertical axis (hereinafter, referred to as the y-axis) and the horizontal axis (hereinafter, referred to as the x-axis) that extend from the first coordinate value ($x_0$, $y_0$) and are perpendicular to each other. The controller 450 may set a parabolic curve, which is separated a specified distance (hereinafter, referred to as the first threshold value K) from the first coordinate value ($x_0$, $y_0$) along the y-axis and is symmetric with respect to the y-axis based on the first threshold value K, as the first dividing line 1302. The controller 450 may set a parabolic curve, which is separated from the reference point ($x_0$, $y_0$) by the first threshold value K along the x-axis and is symmetric with respect to the x-axis based on the first threshold value K, as the second dividing line 1304. The controller 450 may set the first threshold value K in order to set the first dividing line 1302 and the second dividing line 1304. The controller 450 may set the third dividing line 1310 on the basis of which the content is shifted. The controller 450 may set a specified distance (hereinafter, referred to as the second threshold value S) from the reference point ($x_0$, $y_0$) along the y-axis and x-axis in order to set the third dividing line 1310. The controller 450 may shift the content when the second coordinate value is beyond the third dividing line 1310.

According to an embodiment, the first threshold value K, on the basis of which the direction in which the content is to be shifted is set, may be set to be smaller than, or equal to, the second threshold value S, on the basis of which the content is shifted. The first threshold value K and the second threshold value S may be regulated based on the resolution of the display of the electronic device or the nature of the touch panel.

According to an embodiment, the controller 450 may set the area involved in the first dividing area 1302 as a vertical area 1303. The controller 450 may set the area involved in the second dividing line 1304 as a horizontal area 1305. The controller 450 may set the area not involved in the first dividing line 1302 and the second dividing line 1304 as a diagonal area 1307. The controller 450 may set a rectangle with sides of $D_{min}$, which is smaller than the first threshold value K, along the x-axis and y-axis as a threshold area 1301. The first threshold value K, the second threshold value S, and $D_{min}$ may be specified values.

$D_{min}$ may refer to a distance by which a touch is determined to depart from the reference point by a user's motion, or the boundary of a motion event that is generated when the user touches the same point. $D_{min}$ may refer to the minimum distance that forms the basis for determination as to whether a touch generated by the user corresponds to a coordinate value at an error level that is generated without the user's intended motion. Accordingly, when a touch move event generated on the display unit 430 is beyond the threshold area 1301, the controller 450 may identify the direction in which the touch move event moves.

When it is identified in operation 1201 that the touch event is not a touch down event, the controller 450 may perform operation 1205. In operation 1205, the controller 450 may identify whether the touch event is a touch move event or not. The controller 450 may perform operation 1207 when it is identified in operation 1205 that the touch event is a touch move event, and may perform the operation 913 of FIG. 9 when not.

In operation 1207, the controller 450 may identify the first coordinate value ($x_0$, $y_0$) and the second coordinate value ($x_n$, $y_n$) that is identified by the touch move event. The controller 450 may compute a variation ($\Delta x$, $\Delta y$) in location between the first coordinate value and the second coordinate value.

The controller 450 may perform operation 1211 when it is identified in operation 1209 that the direction in which the content is to be shifted corresponds to a diagonal direction and the TouchCount it is smaller than a threshold value T. The controller 450 may perform the operation 913 of FIG. 9 when it is identified in operation 1209 that the direction in which the content is to be shifted does not correspond to a diagonal direction or the TouchCount is not smaller than the threshold value T.

The controller 450 may perform operation 1213 when it is identified in operation 1211 that the variation in location in the x-axis direction is greater than $D_{min}$ or the variation in location in the y-axis direction is greater than $D_{min}$. The controller 450 may perform the operation 913 of FIG. 9 when it is identified in operation 1211 that the variation in location in the x-axis direction is not greater than $D_{min}$ or the variation in location in the y-axis direction is not greater than $D_{min}$. The controller 450 may increase the TouchCount by 1 in operation 1213 and may then perform operation 1215.

The controller 450 may perform operation 1217 when it is identified in operation 1215 that the variation in location between the first coordinate value and the second coordinate value satisfies Equation 1 below.

$$a(\Delta x)^2 + K < \Delta y \quad \text{[Equation 1]}$$

where a is an arbitrary coefficient.

When it is identified in operation 1215 that the variation in location between the first coordinate value and the second coordinate value satisfies Equation 1 above, the controller 450 may, in operation 1217, identify that the second coordinate value is involved in the vertical area 1303 and may set the direction in which the content is to be shifted to a vertical direction.

According to an embodiment, the controller 450 may perform operation 1219 when it is identified in operation 1215 that the variation in location between the first coordinate value and the second coordinate value does not satisfy Equation 1 above. The controller 450 may perform operation 1221 when it is identified in operation 1219 that the variation in location between the first coordinate value and the second coordinate value satisfies Equation 2 below.

$$a(\Delta y)^2 + K < \Delta x \quad \text{[Equation 2]}$$

where a is an arbitrary coefficient.

When it is identified in operation 1219 that the variation in location between the first coordinate value and the second coordinate value satisfies Equation 2 above, the controller 450 may, in operation 1221, identify that the second coordinate value is involved in the vertical area 1305 and may set the direction which the content is to be shifted to a horizontal direction.

The controller 450 may perform the operation 913 of FIG. 9 when it is identified in operation 1219 that the variation in location between the first coordinate value and the second coordinate value does not satisfy Equation 2 above. Operations 1209 to 1221 correspond to the details of the operation 911 shown in FIG. 9.

Figure 14:
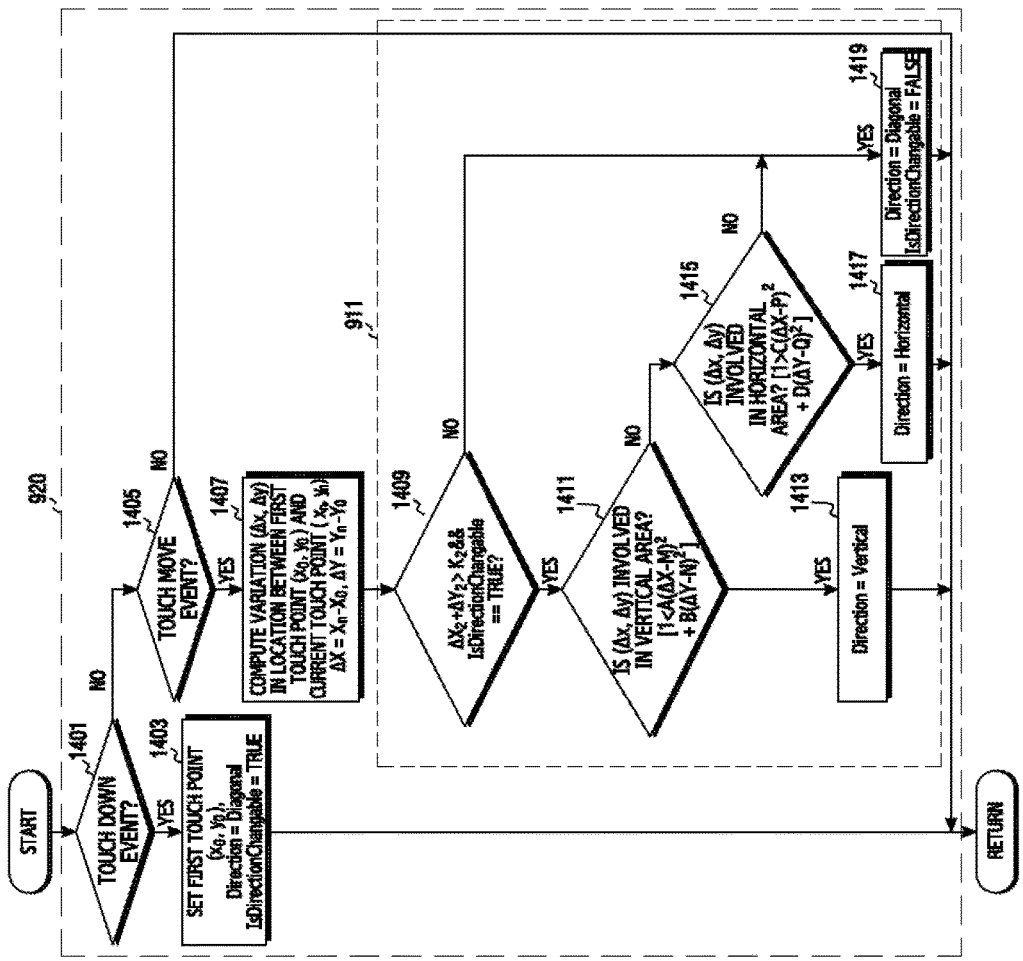
FIG. 14 illustrates a method of setting the direction in which content is to be shifted, according to yet another embodiment of the present disclosure.
Figure 15:
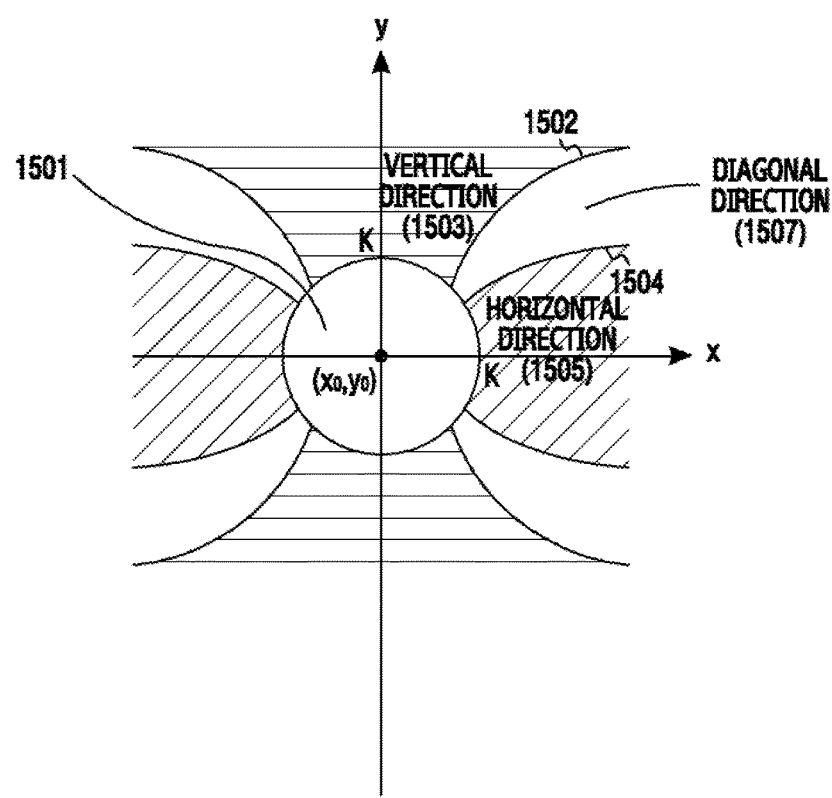
FIG. 15 illustrates a method of setting a shift direction determination area, according to yet another embodiment of the present disclosure.

An operation in which the controller 450 of FIG. 4 controls the setting of the direction in which content is to be shifted, according to yet another embodiment, will be described in more detail with reference to FIGS. 14 and 15. FIG. 14 illustrates a method of setting the direction in which content is to be shifted, according to yet another embodiment of the present disclosure. FIG. 15 illustrates a method of setting a shift direction determination area, according to yet another embodiment of the present disclosure.

Referring to FIGS. 14 and 15, in operation 1401, the controller 450 may identify whether the touch event detected in operation 901 of FIG. 9 is a touch down event or not. When it is identified in operation 1401 that the touch event is a touch down event, the controller 450 may perform operation 1403. In operation 1403, the controller 450 may set the touch point corresponding to the touch down event as the first coordinate value ($x_0$, $y_0$). In operation 1403, the controller 450 may set the direction in which the content is to be shifted to a default value (e.g., diagonal direction). In operation 1403, the controller 450 may set the direction in which the content is to be shifted to be changeable. The controller 450, after completing the setting in operation 1403, may perform the operation 913 of FIG. 9.

As shown in FIG. 15, the controller 450 may set a circle with the center at the first coordinate ($x_0$, $y_0$) and the radius equal to a threshold distance K as a threshold area 1501. The threshold area 1501 may refer to the minimum distance by which the direction of shift of the content is set based on a touch move event input. When the second coordinate value for the touch move event generated on the display unit 430 is beyond the threshold area 1501, the controller 450 may set the direction in which the content is to be shifted.

The controller 450 may define the vertical axis (hereinafter, referred to as the y-axis) and the horizontal axis (hereinafter, referred to as the x-axis) that extend from the reference point and are perpendicular to each other. Referring to FIG. 15, the first dividing line 1502 may be set by Equation 3 below, and the second dividing line 1504 may be set by Equation 4 below.

$$1 = A(X-M)^2 + B(Y-N)^2 \qquad \text{[Equation 3]}$$

where A and B are coefficients of definition for the parabolic curve, and M and N are reference coordinates for the parabolic curve.

$$1 = A(X-M)^2 + B(Y-N)^2 \qquad \text{[Equation 4]}$$

where C and D are coefficients of definition for the parabolic curve, and P and Q are reference coordinates for the parabolic curve.

The coefficients and coordinates used in the above equations may be values stored in the memory 440. The controller 450 may set the area that is in contact with the first dividing line 1502 and the y-axis as a vertical area. 1503. The controller 450 may set the area that is in contact with the second dividing line 1504 and the x-axis as a horizontal area 1505. The controller 450 may set the area that is in contact with the first dividing line 1502 and the second dividing line 1504 as a diagonal area 1507.

When it is identified in operation 1401 that the touch event is not a touch down event, the controller 450 may perform operation 1405. In operation 1405, the controller 450 may identify whether the touch event is a touch move event or not. The controller 450 may perform operation 1407 when it is identified in operation 1405 that the touch event is a touch move event, and may perform the operation 913 of FIG. 9 when not.

In operation 1407, the controller 450 may compute a variation ($\Delta x$, $\Delta y$) in location between the first coordinate value ($x_0$, $y_0$) and the second coordinate value ($x_n$, $y_n$) that is identified by the touch move event.

The controller 450 may perform operation 1411 when it is identified in operation 1409 that the sum of the square of the variation in location in the x-axis direction and the square of the variation in location in the y-axis direction is greater than the square of the threshold distance K, and the direction in which the content is to be shifted is set to be changeable. The controller 450 may perform operation 1413 when it is identified in operation 1411 that the variation in location in the x-axis direction and the variation in location in the y-axis direction are involved in the vertical area 1503. The controller 450 may set the direction in which the content is to be shifted to a vertical direction in operation 1413, and may then perform the operation 913 of FIG. 9.

The controller 450 may perform operation 1419 when it is identified in operation 1409 that the sum of the square of the variation in location in the x-axis direction and the square of the variation in location in the y-axis direction is not greater than the square of the threshold distance K, and the direction in which the content is to be shifted is not set to be changeable. In operation 1419, the controller 450 may set the direction in which the content is to be shifted to a diagonal direction and may set the direction in which the content is to be shifted to be unchangeable. The controller 450, after completing the setting in operation 1419, may perform the operation 913 of FIG. 9.

The controller 450 may perform operation 1415 when it is identified in operation 1411 that the variation in location in the x-axis direction and the variation in location in the y-axis direction are not involved in the vertical area 1503. The controller 450 may perform operation 1417 when it is identified in operation 1415 that the variation in location in the x-axis direction and the variation in location the y-axis direction are involved in the horizontal area 1505. The controller 450 may set the direction in which the content is to be shifted to a horizontal direction in operation 1417, and may then perform the operation 913 of FIG. 9.

The controller 450 may perform operation 1419 when it is identified in operation 1415 that the variation in location in the x-axis direction and the variation in location in the y-axis direction are not involved in the horizontal area 1505. In operation 1419, the controller 450 may set the direction in which the content is to be shifted to a diagonal direction and may set the direction in which the content is to be shifted to be unchangeable. The controller 450, after completing the setting in operation 1419, may perform the operation 913 of FIG. 9.

According to an embodiment, a method of shifting content may include: displaying the content; setting a first coordinate value for a touch as a reference point; setting at least one shift direction determination area based on the reference point; identifying a second coordinate value for the touch: setting the direction in which the content is to be shifted based on the shift direction determination area and the second coordinate value; and shifting the content in the set shift direction when a touch is generated.

Setting the shift direction determination area may include setting the shift direction determination area to a vertical area or a horizontal area.

Setting the direction in which the content is to be shifted may include: setting the direction in which the content is to be shifted to a vertical direction when the second coordinate value is involved in the vertical area; setting the direction in which the content is to be shifted to a horizontal direction when the second coordinate value is involved in the horizontal area; and setting the direction in which the content is to be shifted to a diagonal direction when the second coordinate value is involved in a diagonal area.

Setting the shift direction determination area may include: defining the vertical axis and the horizontal axis that extend from the reference point and are perpendicular to each other; and setting the shift direction determination area according to a first dividing line and a second dividing line, wherein the first dividing line is separated a predetermined distance from the reference point along the vertical axis and is inclined relative to the vertical axis, and the second dividing line is separated a specified distance from the reference point along the horizontal axis and is inclined relative to the horizontal axis.

Setting the direction in which the content is to be shifted include: counting detected touch events when the second coordinate value is beyond a threshold area; and setting the direction in which the content is to be shifted by using the second coordinate value when the number of detected touch events is smaller than a threshold value.

Setting the shift direction determination area may include: defining the vertical axis and the horizontal axis that extend from the reference point and are perpendicular to each other; and setting the shift direction determination area according to a first dividing line and a second dividing line, wherein the first dividing line is a parabolic curve that is separated a specified distance from the reference point along the vertical axis and is symmetric with respect to the vertical axis based on the coordinates at the specified distance from the reference point, and the second dividing line is a parabolic curve that is symmetric with respect to the horizontal axis based on the coordinates at the specified distance from the reference point.

Setting the shift direction determination area may include setting the first dividing line and the second dividing line by at least one of an exponential function and a logarithmic function.

Setting the shift direction determination area may include setting a circle with the center at the reference point, which is a threshold area, and setting the shift direction determination area according to two parabolic curves, or two straight lines, that start from two points on the circumference of the circle.

Setting the direction in which the content is to be shifted may include setting the direction in which the content is to be shifted by using the second coordinate value when the second coordinate value is beyond the threshold value.

Displaying the content may include displaying a part of the content.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
a housing;
a touch screen disposed on one side of the housing and having a first edge extending in a first direction and a second edge extending in a second direction that is perpendicular to the first direction; and
a processor electrically connected to the touch screen, the processor is configured to:
display a screen on the touch screen,
receive a gesture input, through the touch screen, which has first coordinates, second coordinates, and at least one between the first coordinates and the second coordinates,
determine whether the gesture input corresponds to one of:
a first area defined between a first virtual line and a second virtual line, the first virtual line extending in a third direction different from the first and second directions with respect to first reference coordinates separated a specified distance from the first coordinates along the first direction, and the second virtual line extending in parallel with the first virtual line in a fourth direction different from the first and second directions with respect to a second reference coordinates separated the specified distance from the first coordinates along the second direction;
a second area opposite to the first area with respect to the first virtual line; and
a third area opposite to the first area with respect to the second virtual line, and
shift the screen in the first direction, in the second direction, or in one direction between the first and second directions based on the determination.

2. The electronic device of claim 1, wherein the third direction and the fourth direction are the same.

3. The electronic device of claim 1, wherein a length of the first edge is shorter than a length of the second edge.

4. The electronic device of claim 1, wherein an angle between the third direction and the first direction is less than or equal to 90 degrees.

5. An electronic device comprising:
a housing;
a touch screen disposed on one side of the housing and having a first edge extending in a first direction and a second edge extending in a second direction that is perpendicular to the first direction; and
a processor electrically connected to the touch screen, the processor is configured to:
display a screen on the touch screen,
receive a gesture input, through the touch screen, which has first coordinates and second coordinates,
acquire a first shift value in the first direction and a second shift value in the second direction based on a shift of the gesture input from the first coordinates to the second coordinates,
compute a first result value and a second result value using the first shift value and the second shift value,
shift the screen in the first direction according to a first result obtained by comparing the first result value with a first threshold value,
shift the screen in the second direction according to a second result obtained by comparing the second result value, with a second threshold value, and
shift the screen in a third direction between the first and second directions according to the first result obtained by comparing the first result value with the first threshold value and the second result obtained by comparing the second result value with the second threshold value,
wherein the first threshold value is associated with a first virtual line that extended in a third direction different from the first and second directions with respect to first reference coordinates separated a specified distance from the first coordinates along the first direction,
wherein the second threshold value is associated with a first line that extended in parallel with the first virtual line in a fourth direction different from the first and second directions with respect to second reference coordinates separated the specified distance from the first coordinates along the second direction.

6. The electronic device of claim 5, wherein the first result value is a first difference value obtained by subtracting the second shift value from the first shift value, and the second result value is a second difference value obtained by subtracting the first shift value from the second shift value.

7. The electronic device of claim 6, wherein the processor is configured to:
shift the screen in the first direction when the first difference value is greater than the first threshold value;
shift the screen in the second direction when the second difference value is greater than the second threshold value; and
shift the screen in the third direction when the first difference value is smaller than, or equal to, the first threshold value and the second difference value is smaller than, or equal to, the second threshold value.

8. The electronic device of claim 5, wherein the first threshold value or the second threshold value is proportional to the first shift value or the second shift value, and the first threshold value and the second threshold value are the same as each other.

9. The electronic device of claim 5, wherein a user input count is increased based on a determination that the first shift value or the second shift value exceeds a third threshold value, and the third threshold value is smaller than the first threshold value or the second threshold value.

10. The electronic device of claim 9, wherein the processor does not shift the screen when the user input count is smaller than a fourth threshold value.

11. The electronic device of claim 5, wherein the first result value is a first determination value computed by a function that is specified based on the first shift value and the second shift value, and the second result value is a second determination value computed by the function that is specified based on the first shift value and the second shift value.

12. The electronic device of claim 11, wherein the processor is configured to:
shift the screen in the first direction when the first determination value is greater than the first threshold value:
shift the screen in the second direction when the second determination value is greater than the second threshold value; and
shift the screen in the third direction when the first determination value is smaller than, or equal to, the first threshold value and the second determination value is greater than, or equal to, the second threshold value.

13. The electronic device of claim 12, wherein the first threshold value and the second threshold value are equal to 1.

14. The electronic device of claim 11, wherein the function comprises at least one of an exponential function or a logarithmic function.

15. A method of shifting content in an electronic device, comprising:
displaying the content;
setting a first coordinate value for a touch as a reference point;
setting at least one shift direction determination area based on the reference point, the shift direction determination area comprises at least one of a vertical area or a horizontal area;
identifying a second coordinate value for the touch;
determining whether the second coordinate value corresponds to one of the vertical area or the horizontal area;
setting a direction in which the content is to be shifted based on the determination; and
shifting the content in the set direction,
wherein the setting of the shift direction determination area comprises:
setting a circle with a center at the reference point as a threshold area; and
setting the shift direction determination area according to a first dividing line and a second dividing line, which are two curves starting from points on a circumference of the circle.

16. The method of claim 15, wherein the setting of the shift direction determination area comprises:
setting the shift direction determination area to a vertical area or a horizontal area.

17. The method of claim 16, wherein the setting of the direction in which the content is to be shifted comprises:
setting the direction in which the content is to be shifted to a vertical direction when the second coordinate value is involved in the vertical area; and
setting the direction in which the content is to be shifted to a horizontal direction when the second coordinate value is involved in the horizontal area.

18. The method of claim 17, wherein the setting of the direction in which the content is to be shifted comprises:
counting detected touch events when the second coordinate value is beyond a threshold area; and
setting the direction in which the content is to be shifted by using the second coordinate value, when a number of detected touch events is smaller than a threshold value.

19. The method of claim 18, wherein the setting of the direction in which the content is to be shifted comprises:
setting the direction in which the content is to be shifted by using the second coordinate value, when the second coordinate value is beyond the threshold value.

* * * * *